United States Patent
Gencer et al.

(10) Patent No.: US 9,162,909 B2
(45) Date of Patent: Oct. 20, 2015

(54) METHOD AND APPARATUS FOR THE BIO-REMEDIATION OF AQUEOUS WASTE COMPOSITIONS

(71) Applicant: IMET CORPORATION, Cleveland, OH (US)

(72) Inventors: Mehmet A. Gencer, Brecksville, OH (US); Kaan Gencer, Brecksville, OH (US); Paul M. Zakriski, Broadview Heights, OH (US)

(73) Assignee: IMET CORPORATION, Cleveland, OH (US)

( * ) Notice: Subject to any disclaimer, the term of this patent is extended or adjusted under 35 U.S.C. 154(b) by 336 days.

(21) Appl. No.: 13/780,756

(22) Filed: Feb. 28, 2013

(65) Prior Publication Data

US 2014/0238933 A1 Aug. 28, 2014

(51) Int. Cl.
C02F 3/06 (2006.01)
C02F 3/10 (2006.01)
C02F 3/34 (2006.01)

(52) U.S. Cl.
CPC ............... C02F 3/109 (2013.01); C02F 3/101 (2013.01); C02F 3/06 (2013.01); C02F 3/105 (2013.01); C02F 3/341 (2013.01); C02F 3/347 (2013.01); Y02W 10/15 (2015.05)

(58) Field of Classification Search
CPC ............ C02F 3/101; C02F 3/109; C02F 3/06; C02F 3/105; C02F 3/341; C02F 3/347; C02F 3/085; C02F 3/10; C02F 3/34; C02F 1/283
USPC .......................... 210/617, 615, 602
See application file for complete search history.

(56) References Cited

U.S. PATENT DOCUMENTS

| | | | |
|---|---|---|---|
| 3,563,888 A | 2/1971 | Klock | |
| 3,894,355 A | 7/1975 | Carothers | |
| 4,810,385 A | 3/1989 | Hater et al. | |
| 4,859,594 A | 8/1989 | Portier | |
| 4,882,066 A | 11/1989 | Portier | |

(Continued)

OTHER PUBLICATIONS

Wojnowska-Baryla, I, et al., Carbon and Nitrogen Removal by Biomass Immobilized in Ceramic Carriers, Polish Journal of Environmental Studies, vol. 11, No. 5, 2002, pp. 577-584.

(Continued)

Primary Examiner — Nam Nguyen
Assistant Examiner — Claire Norris
(74) Attorney, Agent, or Firm — Hudak, Shunk & Farine Co. LPA

(57) ABSTRACT

Numerous different types of waste compositions generally in an aqueous environment are bio-remediated under aerobic conditions utilizing highly diverse and multiple microorganisms within a reactor. The process is carried out with the microorganisms attached or bound by a variety of different surface characteristics to packing substrates, located within the reactor, having high surface areas and high porosity in the form of small micropores. Multiple different types of substrates are generally utilized that efficiently dissolve air into the water, as well as to maximize the concentration and diversity of types of microorganisms. Reactors are utilized that desirably have tubes therein containing the multiple types of packings and microorganisms and contain at least one perforated chimney through which air can flow and optimize dissolving oxygen into the aqueous environment of the various bio-remediation stages.

22 Claims, 22 Drawing Sheets

(56) References Cited

U.S. PATENT DOCUMENTS

| | | |
|---|---|---|
| 5,021,088 A | 6/1991 | Portier |
| 5,211,848 A | 5/1993 | Friday et al. |
| 5,217,616 A | 6/1993 | Sanyal et al. |
| 5,240,598 A | 8/1993 | Portier et al. |
| 5,403,487 A | 4/1995 | Lodaya et al. |
| 5,534,143 A | 7/1996 | Portier et al. |
| 5,569,634 A | 10/1996 | Miller et al. |
| 5,747,311 A | 5/1998 | Jewell |
| 6,231,766 B1 | 5/2001 | Hausin |
| 2009/0255871 A1 | 10/2009 | Davis |
| 2009/0283472 A1* | 11/2009 | Gerardi et al. ............ 210/615 |
| 2011/0120925 A1 | 5/2011 | McCague |
| 2011/0127215 A1 | 6/2011 | Gencer et al. |
| 2011/0284438 A1* | 11/2011 | Jowett et al. ............ 210/151 |

OTHER PUBLICATIONS

Wojnowska-Baryla, I, et al., The Biodegradable of Brewery Wastes in a Two-Stage Immobilized System, Polish Journal of Environmental Studies, vol. 11, No. 5, 2002, pp. 571-575.

* cited by examiner

METHOD AND APPARATUS FOR THE BIO-REMEDIATION OF AQUEOUS WASTE COMPOSITIONS

FIELD OF THE INVENTION

The present invention relates to aerobic bio-remediation of waste compositions desirably in an aqueous environment so that they are converted or reacted into non-harmful and/or desirable end products. The conversion is generally carried out in reactors containing multiple and often numerous different types of packing substrates therein of various sizes, shapes, etc. to maximize dissolving of oxygen as from air into water as well as to increase the concentration of the diverse types of microorganisms. The substrates have very high surface areas and varying surface chemistries and physics to incorporate, bind, or attach a highly diverse and multiple microorganisms to effectively treat a maximum amount of different components of the wastewater as possible. An important aspect of the packing substrates is that they are highly porous and have numerous micro-pores therein to help maintain the microorganisms therein. The reactors have one or more perforated tubes that contain one or more different types of packing substrates that have thereon one or more different types of microorganisms.

BACKGROUND OF THE INVENTION

Heretofore, waste treatment systems were generally specialized with regard to the decontamination, immobilization, etc., of narrow or specific types of compounds, and generally were not efficient.

U.S. Pat. No. 3,894,355 relates to a method for field growing crops using solid and liquid waste and apparatus for practicing the method. The field to be used is provided in side-by-side spaced relation with row-like growing areas defined by paired laterally spaced perforated side walls extending the full length of the growing areas. The upper runs of the side walls of the respective growing areas mount in longitudinally spaced upstanding, spanning relation respective inverted, V-shaped, bracket members centrally depressed to provide longitudinally aligned U-shaped cradle seats supportingly receiving a continuous pipeline segment the opposite adjacent ends of which are cross-connected to form a continuous pipeline capped at one end and adapted at the opposite end for connection to a source of irrigating liquid which may be either hydrant water or the nutrient rich effluent of a sewage treatment plant. The pipeline at longitudinally spaced intervals along each growing area is fitted with downwardly directed mist nozzles arranged to spray the irrigating liquid downwardly between the paired side walls to provide a downward trickle flow of irrigating liquid successively through a longitudinally continuous topping layer of high nitrogenous humic acid forming material, a layer of top soil mixed with manure, a layer of mulch, a layer of bone meal, a layer of top soil, a further layer of mulch, a layer of inorganic alkaline potash, a further layer of top soil, a final layer of mulch into a layer of loose aggregate provided to support the roots of the growing food crop. The descending trickle flow by its leaching action enters the loose aggregate as a readily assimilable bacterial culture containing the complete plant nutrients including major and trace elements to seasonally feed the plants and produce a more perfect and prolific harvest.

U.S. Pat. No. 4,810,385 relates to a device suitable for seeding bacterial cultures to waste flowing through or which has accumulated in a collection system which comprises a porous outer covering member which forms an enclosed package with a source of bacterial cultures contained within said package, said cultures suitable for seeding a collection system as a waste stream flows through the porous covering member of said enclosed package causing the bacteria to be released into said waste stream.

U.S. Pat. No. 4,859,594 relates to a novel microorganisms separated from natural environments and purified and genetically modified, process for immobilizing these microorganisms by affixing then to substrates, the biocatalytic compositions formed by these microorganisms affixed to substrates, and the use of the biocatalytic compositions for the detoxification of toxin-polluted streams. The microorganisms are (1) *Pseudomonas fluorescens* (ATCC SD 904); (2) *Pseudomonas fluorescens* (ATCC SD 903); (3) *Pseudomonas cepacia* (ATCC SD 905); (4) *Methylobacter rhodinum* (ATCC 113-X); and (5) *Methylobacter* species (ATCC 16 138-X).

U.S. Pat. No. 4,882,066 relates to compositions characterized as porous solids on the surfaces of which thin films of chitinous material are dispersed, and to a process employing chitin per se, and preferably the chitin coated compositions, supra, as contact masses for the removal of metals contaminants, or halogenated organic compounds, from liquid streams contaminated or polluted with these materials.

U.S. Pat. No. 5,021,088 relates to a process for the separation and recovery from an ore of a metal, or metals, particularly strategic and precious metals, notably gold. A carbon-containing, gold-bearing ore, notably a carbonaceous or carbonaceous pyritic ore, is contacted and microbially pretreated and leached with a heterotrophic microorganism, or admixture of microorganisms, at heterotrophic conditions to cultivate and grow and said microorganism, or microorganisms, and reduce the carbon content of the ore by consumption of the carbon. The ore, as a result of the heterotrophic pretreatment is subsequently more advantageously colonized by an autotrophic microorganism, or microorganisms, at autotrophic conditions, or hydrometallurgically treated, or both, to facilitate, enhance and increase the amount of gold recovered vis-a-vis a process wherein the gold is recovered (1) by hydrometallurgical processing alone at otherwise similar conditions, or (2), in treating a pyritic ore, by the combination of the autotrophic/hydrometallurgical processing, at otherwise similar conditions.

U.S. Pat. No. 5,211,848 relates to a continuous flow, immobilized cell reactor, and bioprocess, for the detoxification and degradation of volatile toxic organic compounds. The reactor is closed, and provided with biocatalysts constituted of specific adapted microbial strains immobilized and attached to an inert porous packing, or carrier. A contaminated groundwater, industrial or municipal waste, which is to be treated, is diluted sufficiently to achieve biologically acceptable toxicant concentrations, nutrients are added, and the pH and temperature are adjusted. The contaminated liquid is introduced as an influent to the closed reactor which is partitioned into two sections, or compartments. Air is sparged into the influent to the first compartment to mix with and oxygenate the influent with minimal stripping out of the toxic organic compounds. The second section, or compartment, is packed with the biocatalyst. The oxygenated liquid influent is passed through the second compartment substantially in plug flow, the biocatalyst biodegrading and chemically changing the toxic component, thereby detoxifying the influent. Non-toxic gases, and excess air from the first compartment, if any, are removed through a condenser located in the overhead of the reactor. Liquids are re-condensed back to the aqueous phase via the condenser.

U.S. Pat. No. 5,217,616 relates to a process for reducing the concentration of an organic and/or inorganic pollutant in a fluid stream which comprises passing the stream through a bioreacter containing a fixed biologically active biomass comprising an effective number of open or substantially open spaces and a plurality of biologically active bodies comprising a hydrophobic polyurethane substrate having an effective amount of one or more microorganism capable of metabolizing at least one of the said pollutant on, in or on and in said substrate in the absence or in the substantial absence of an absorbent.

U.S. Pat. No. 5,240,598 relates to a microbubble generator is disclosed for optimizing the rate and amount of oxygen transfer to microbial inocula or biocatalysts in bioreactor systems. The microbubble generator and an associated immobilized cell reactor, are useful in the detoxification and cleanup of non-volatile polymeric and volatile organic-contaminated aqueous streams. In particular, they are useful in the continuous mineralization and biodegradation of toxic organic compounds, including volatile organic compounds, associated with industrial and municipal effluents, emissions, and ground water and other aqueous discharges. One embodiment of the invention includes a microbubble chamber packed with small inert particles through which a liquid effluent and oxygen or another gas are admitted under pressure, followed by a venturi chamber to further reduce the size of bubbles.

U.S. Pat. No. 5,403,487 relates to the biochemical oxidation of two wastewater feeds, one containing at least ten times more ammonia nitrogen, and the other at least ten times more chlorinated hydrocarbons, than present in a conventional municipal wastewater stream were treated in an aerated packed bed bioreactor inoculated with microorganisms ("cells") especially cultured and acclimated to the task. Arbitrarily shaped pieces of numerous macroporous synthetic resinous materials (familiarly referred to as "porous plastics") supposedly provide not only a packing for the bioreactor, but also a peculiar catalytic function not normally associated with a bio-support.

U.S. Pat. No. 5,534,143 relates to a microbubble generator is disclosed for optimizing the rate and amount of oxygen transfer to microbial inocula or biocatalysts in bioreactor systems. The microbubble generator, and an associated immobilized cell reactor, are useful in the detoxification and cleanup of non-volatile polymeric and volatile organic-contaminated aqueous streams. In particular, they are useful in the continuous mineralization and biodegradation of toxic organic compounds, including volatile organic compounds, associated with industrial and municipal effluents, emissions, and ground water and other aqueous discharges. One embodiment of the invention includes a microbubble chamber packed with small inert particles through which a liquid effluent and oxygen or another gas are admitted under pressure, followed by a venturi chamber to further reduce the size of bubbles.

U.S. Pat. No. 5,569,634 relates to porous bodies produced which are suitable for use as supports for catalysts, including living cells, such as bacteria and which are upset resistant to acids and bases. The bodies have a significantly large average pore diameter of about 0.5 to 100 microns, (i.e. 5,000 to 1,000,000 ANG.) and a total pore volume of about 0.1 to 1.5 cc/g with the large pores contributing a pore volume of from about 0.1 to 1.0 cc/g. The bodies are made by preparing a mixture of ultimate particles containing a zeolite and one or more optional ingredients such as inorganic binders, extrusion or forming aids, burnout agents, or a forming liquid, such as water.

U.S. Pat. No. 3,563,888 relates to a waste containing liquor that is biochemically treated by continuously recirculating it through a sand-gravel filter media which is submerged in the liquor while continuously withdrawing a small portion of said liquor. A pressurized column of oxygen-containing fluid entrains and lifts the liquid waste through an unobstructed tube and recirculates it downwardly through the filter media. During the lifting process oxygen from the fluid permeates the waste in order to ensure active aerobic metabolism. The treated effluent is directed to a storage area, or preferably it is conveyed to another tank for further treatment.

U.S. Pat. No. 5,747,311 relates to a method for chemically modifying a reactant using microbes. The method includes providing a particulate material which includes a plastic carrier and microbes attached to the carrier. The particulate material is dispersed in a dispersing fluid and has a specific gravity less than that of the dispersing fluid. When the microbe is anaerobic the particulate material has an operating interfacial surface area of from about 2,000 to about 240,000 square meters per cubic meter of reactor volume. When the microbe is aerobic the particulate material has an operating interfacial surface area of from about 1,000 to about 30,000 square meters per cubic meter of reactor volume. The method further includes establishing a flow of the reactant through the particulate material effective to chemically modify the reactant.

U.S. Pat. No. 6,231,766 relates to a process for treating a body water to purify it. In this process, a portion of the water to be treated is continuously caused to flow at a rate of at least about 60 feet per minute and is continuously agitated, aerated, and fed into a biochamber within which are disposed at least five distinct strains of microorganisms. A screen is disposed in the biochamber below the microorganisms, and air is forced through such screen during the processing of the water.

The article Carbon and Nitrogen Removal by Biomass Immobilized in Ceramic Carriers by I. Wojnowski-Baryla, et al., relates to an experiment conducted in a bioreactor with biomass immobilization in ceramic carriers. The influence of hydraulic retention time (HRT), carrier structure and intrinsic circulation rate on carbon and nitrogen removal from municipal wastewater were investigated. Two types of ceramic carriers were used at HRT 70, 60, 40, 30 min for carrier I, and 70, 60, 30, 15 min for carrier II, and at the circulation rate of 60, 40, and 20 $dm^3 \ h^{-1}$. The highest nitrogen removal efficiency was achieved in carrier II at 30 min of reaction. The carbon removal efficiency was similar for both carriers. An increase in internal circulation rate from 20 to 60 $dm^3 \ h^{-1}$ enhanced nitrogen removal efficiency from 33.0 to 47.2% and decreased in the production of surplus sludge in carrier II.

The article The Biodegradation of Brewery Wastes in a Two-Stage Immobilized System by I. Wojnowski-Baryla, et al, relates to the investigation in a loop bioreactor, where biomass was immobilized in the ceramic carrier. The influence of the internal circulation rate on the biodegradation efficiency of brewery wastes by immobilized biomass and on production of surplus sludge was examined. The rates of the internal circulation were 12, 38, 50 $dm^3 \ h^{-1}$. The experiments were performed at constant loading rate of the carrier of 17.9 caused enhancement of the removal rate from 0.40 to 0.48 gCOD $dm^3 \ h^{-1}$ and limitation of surplus sludge productivity from 0.67 to 0.27 $g \ g^{-1}$ COD removed. The biodegradation rate of brewery wastes in a two-stage immobilized system was determined. The hydraulic retention time in this two-stage immobilized system was 6 h, which was enough to get a COD below 150 mg $dm^{-3}$ in the effluent.

SUMMARY OF THE INVENTION

Different reactors contain multiple reactor stages having multiple substrates that are microporous and possess high surface areas. Multiple different types of microorganisms are attached by a variety of different, surface characteristics to the porous substrates. The substrates are desirably selected upon the basis of being able to attract different and multiple types of microorganisms as well as dissolve air into water. Moreover, the reactor contains one or more chimneys that are perforated and further aid in dissolving oxygen (such as laterally) into the various reactor stages. The reactors are utilized to bio-remediate various aqueous waste compositions that contain various undesirable compounds such as nitrogen, sulfur, and the like.

Instead of reactors having multiple stages each containing packing substrates having microorganisms thereon, the reactor can contain one or more perforated bio-remediation tubes that contain one or more porous substrates thereon that contain one or more microorganisms. Additionally, the non-tube areas of the reactor also contain at least one packing substrate that contains one or more types of microorganisms thereon.

An embodiment of the present invention relates to an apparatus for the bio-remediation of an aqueous waste composition, comprising: a reactor having one or more wall side perforated bio-remediation tubes, each said tube, independently, having therein one or more different types of packing substrates, said substrates being porous and having micro-pores therein; said reactor having a non-tube reactor area comprising at least one type of packing substrate therein, said non-tube reactor packing substrates being porous and having micro-pores therein; said reactor having multiple types of different microorganisms therein, said microorganisms being attached to said packing substrates; said bio-remediation reactor having at least one perforated chimney pipe; said reactor having an inlet capable of admitting an aqueous waste composition to said reactor; said reactor having an inlet capable of admitting oxygen to said reactor; and said reactor having an outlet.

A process for the bio-remediation of an aqueous waste composition, comprising the steps of: feeding said aqueous waste water composition to a reactor or inserting a reactor into an existing waste water composition; said reactor comprising one or more side wall perforated bio-remediation tubes, each said tube, independently, having therein one or more different types of packing substrates, said substrates being porous and having micro-pores therein; said reactor having a non-tube reactor area comprising at least one type of packing substrate therein, said non-tube reactor packing substrates being porous and having micro-pores therein; said reactor having multiple types of different microorganisms therein, said microorganisms being attached to said packing substrates; said bio-remediation reactor having at least one perforated chimney pipe; feeding air to said bio-remediation reactor and bio-remediating said aqueous waste water; and emitting treated waste water from said reactor.

BRIEF DESCRIPTION OF THE DRAWINGS

FIG. 22A is a perspective side view of the reactor of the present invention; FIG. 22B is a top view of the reactor of the present invention; FIG. 22C is a side elevation and partial cross-section of the reactor of the present invention; and FIG. 22D is a top view of a sock of the present invention.

DETAILED DESCRIPTION OF THE INVENTION

Figure 1:
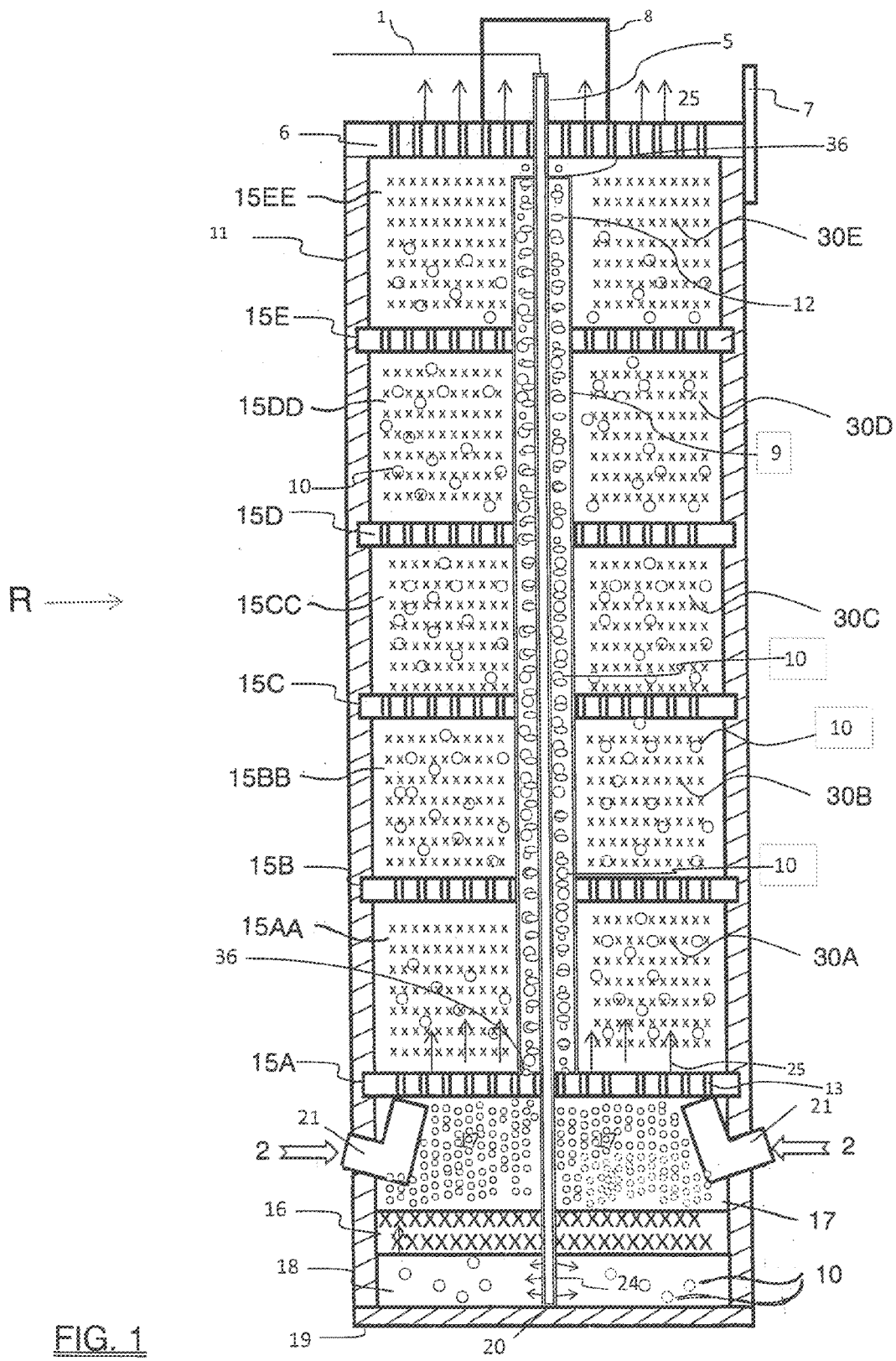
FIG. 1 is a cross-section elevation view of a treatment reactor in accordance with the present invention.

The waste compositions comprise numerous compounds, waste sources and materials that are treatable by aerobic remediation with various microorganisms in an aqueous environment with an oxygen source such as air. Anaerobic remediation is not part of the present invention. Waste compositions generally include industrial, residential, commercial, sewage, corrosive compounds, and the like.

The method and apparatus according to the present invention eliminates carbonaceous compounds, odors, noxious compounds, toxic compounds, compounds containing ammonia, ammonium, $NO_2$, $NO_3$, $H_2S$, bio-sludge, etc. More specifically, examples of industrial waste include hydrocarbons such as hexane, benzene, toluene, xylene, and the like, and alcohols such as ethanol, methanol, phenol, and the like, and nitrogen-containing chemicals such as ammonia, aniline, morphiline, and the like as well as waste from restaurants and food service operations that generally produce large amounts of fats, oils, and grease. Such compounds have and can block sewers, pipelines and the like. Examples of residential waste include dissolved sugar sources, waste food, fats, grease and oil, and the like and dissolved proteins, starches, and of course human excrement. Examples of commercial waste include dissolved sugar sources, waste food, fats, grease and oil and the like and dissolved proteins, starches and the like, as well as excrement from animals, for example, cows, horses, pigs, chickens, and the like. Examples of sewage include waste from any industrial, residential, and commercial sources that are of course piped to a municipal treating plant. Examples of corrosive compounds include sulfur-containing compounds such as $H_2S$ and the like, and carbonate-containing compounds such as lime and soda and the like, nitrate-containing compounds such as vinegar, fertilizer and the like, food sources such as vinegar and the like, and chloride-containing compounds such as table salt and the like.

The microorganisms that are utilized in the bio-remediation of the above wastes generally work through several different mechanisms such as eradication, reaction therewith, formation of complexes, splitting of molecules, formation of new compounds such as carbon dioxide, water, sulfur dioxide, nitrites, nitrates, and nitrogen and the like. As noted above, preferably numerous and different types of microorganisms are utilized in the reactor so that a highly diverse microbial population exists to effectively treat most, and even all of the various types of the waste components found in the aqueous waste composition. Desirably, microorganisms are utilized that are found in nature such as in the soil, trees, ponds, lakes, streams, rivers, grains, plants, mold, spores, fungi, and the like. Microorganisms are generally defined as being cellular and being able to replicate without a host cell. One desired source of microorganisms are the various bacteria that are known to remediate various waste compositions. The different types of bacteria are numerous and known to the art and to the literature and thus include bacteria to biodegrade carbonaceous compounds such as *pseudomonas* species such as *Pseudomonas vesicularis, Pseudomonas putida* and *Aeromonas hydrophila, Brevibacterium acetylicum,* bacteria to biodegrade nitrogen-containing compounds such as *Nitrobacter* species such as *Nitrobacter winogradskyi* and *Nitrosomonas* species such as *Nitrosomonas europaea* and bacteria to biodegrade sulphur-containing compounds such as *Thiobacillus* species such as *Thiobacillus denitrificans* and the like. Other microorganisms include various fungi such as those that naturally exist in mushrooms, yeasts, and molds. Generally they lack chlorophyll, have a cell wall composed of polysaccharides, sometimes polypeptides, and chitin, and reproduce either sexually or asexually. Protozoa are simple microorganisms consisting of unicellular organisms that range in size from sub-microscopic to macroscopic. Types of protozoa include *sarcomastigophora, labyrinthomorpha, apicomplexa, microspora, acetospora, myxozoa,* and *ciliophora*. Preferably at least two or three, and even four or more different types of microorganism exist within the same bio-remediation stage of the apparatus of the present invention inasmuch as the same has been found to destroy, eradicate, eliminate, react with, the various carbonaceous compounds, various nitrogen containing compounds, various sulfur containing compounds, various toxic compounds, and the like.

In order to be effective, the various microorganisms have to be attached, contained, captured, bound, etc., by various substrates so that they are not washed away by the flow of the aqueous waste composition as it flows through a treating apparatus such as a reactor. In order to yield effective and efficient results, the packing substrates of the present invention have various desirable attributes. An important attribute is a high average surface area such as from at least about 100 square meters per cubic meter ($M^2/M^3$) and desirably at least about 500 $M^2/M^3$ to about 1,000 $M^2/M^3$ and even 200,000 $M^2/M^3$ where $M^2$ is the surface area and $M^3$ is the volume. A more desirable range of the one or more high surface area packing substrates is from about 500 $M^2/M^3$ or 800 $M^2/M^3$ to about 10,000 $M^2/M^3$. At least one, and desirably a plurality of the bio-remediation stages contain two or three, or even four or more different types of packing substrates therein.

Another important attribute is that the substrate be porous and have a large number of pores therein. The average size of the pores are desirably small but sufficiently large enough to house one or more microorganisms including a colony of various microorganisms. The average pore size can vary over a wide range such as from, at least about 1 micron to about 150 microns, or up to about 250 microns, and even up to about 500 microns. More desirable pore sizes range from about 4, or about 20, or about 30, or about 50 microns to about 75 microns or about 100 microns. The pores desirably exist not only on the surface of the substrate, but also in the interior thereof and entirely there through such that the substrate often has an "open pore structure".

As indicated above, another important attribute is that multiple microorganism, e.g. 2, 3, 4, 5, etc. be applied, attached, fixed, etc., to the packing substrate. Such binding can occur in a number of ways, modes, or surface characteristics such as physically or physico-chemically. Physical attachment can occur by the substrate having a rough surface to help mechanically secure the microorganisms thereto. Physico-chemical attachment can occur through dipolar interaction of the microorganisms to a substrate such as Vanderwalls forces and the like. Physico-chemical attachment can also occur through a cation or an anion microorganism portion respectively with an anionic or a cationic portion of the substrate attachment can also occur through polar or non-polar bonding. Similarly, ionic or non-ionic portions of the microorganism can be attached via ionic or non-ionic bonding. Silica ($SiO_2$) provides anionic surface characteristics while alumina ($Al_2O_3$) provides cationic surface characteristic. Ion exchange resins (cation, anion) can also be used to immobilize a variety of microorganisms utilizing anionic and cationic attractions. Similarly, hydrophobic portions of the microorganism can be attached to hydrophobic portion of the substrate or via a hydrophilic-hydrophilic alignment, etc. While polyethylene and Teflon provide hydrophobic surface characteristics acrylic polymer provides hydrophilic surface characteristics. The above attachment of the microorganisms to the porous substrates is such that the microorganisms are maintained in place throughout the bio-remediation process.

An important aspect of the present invention is that multiple and generally numerous different types of porous substrates are utilized within a single reactor. Substrates generally include minerals, carbon substrates, ceramic, metal substrates, polymers or plastics, and the like. Examples of various minerals include clay, diatomaceous earth, fuller's earth, titanium dioxide, zirconium dioxide, chromium oxide, zinc oxide, magnesia, bona, boron nitride, pumice, lava, including crushed lava, celite, slag, and the like. Examples of carbon substrates include charcoal, coal, pyrolized wood or wood chips, activated carbon and the like. Ceramics are generally silicates, alumina, mullite, and include brick, tile, terra cotta, porcelain, glasses of all types such as sodium glass and boron glass, porcelain enamels, refractories such as alumina, silicone carbide, boron carbide, and the like. Metal substrates include iron, nickel, cobalt, zinc, aluminum, and the like.

Polymers or plastics constitute another class of porous packing substrates and include homopolymers, copolymers, graph copolymers, and the like such as polystyrene or copolymers of styrene and/or α-methyl styrene and acrylonitrile, and copolymers of styrene/acrylonitrile (SAN), terpolymers of styrene, acrylonitrile and diene rubber (ABS), copolymers of styrene/acrylonitrile modified with acrylate elastomers (ASA), copolymers of styrene/acrylonitrile modified with ethylene/propylene/diene monomer (EPDM) rubber (ASE), and copolymers of styrene and maleic anhydride (SMA); polyolefins such as polyethylene and polypropylene and mixtures thereof; chlorinated polyvinyl chlorides (CPVC); polycarbonates (PC); thermoplastic polyesters (TPES) including polybutylene terephthalate (PBT), polyethylene terephthalate (PET), and aromatic polyesters; polyether-ester segmented copolymers, such as Hytrel* by DuPont Corp.; polyurethanes (PUR); miscible blends of polystyrenes and polyphenylene oxides (PRO), commercially available as Norel from General Electric Company; polyacetals (POM); polymers of acrylic acid, methacrylic acid, acrylic esters, and methacrylic esters; polyamide-imides; polyacrylonitriles; polyarylsulfones; polyester-carbonates; polyether-imides; polyether-ketones (PEK); polyether-ether-ketones (PEEK); polyalphaether ketones (PAEK); polyether sulfones; polyphenylene sulfides; polysulfones; nylons; anionic and cationic exchange resins, combinations of any of these polymers as well as recycled mixed plastics and the like.

The pH of the packing substrate can be important and can range from about 4 to about 10 and preferably from about 6.0 to about 8.

In order to achieve efficient and thorough bio-remediation of aqueous waste compositions, it is important that the above-noted aspects of the present invention be incorporated within the reactors. Moreover, it is an additional important aspect that the packing substrates be of a size, shape, and type so that it aids in dissolving a high amount of oxygen into the water such as at least an average of about 1 part by weight, desirably at least about 2 parts by weight, preferably from about 3 to about 8 parts by weight per million parts by weight of waste water.

With respect to the overall reactor design, the individual reactors can have various shapes, including rectangular, square, and the like, and forms, but desirably are elongated as in the form of a column or tower containing the packing substrate therein with the pores thereof containing multiple types of microorganisms. A variety of microorganisms in liquid form or dry form are obtained from commercial sources as well as natural sources are added either before or immediately after inserting into the treatment area. Microorganisms are also added into wastewater periodically when needed. The waste compositions contained in an aqueous environment are generally added near the bottom of the reactor with air generally being pumped in at the bottom of the reactor. The addition of air under slight pressure will naturally rise through the reactor and encounter the aqueous wastewater composition and cause the same to rise. The air-wastewater composition then encounters various stages of the reactor containing multiple types of packing substrate containing multiple types of microorganisms in the pores thereof. As noted above, since high oxygen content is necessary for efficient operation of the reactor, packing substrates are chosen that provide good mixing of the air with water and thereby fuse the air into smaller bubbles and dissolve some of the oxygen within the water. Thus, substrates are chosen that form a tight packing with one another and have a high packing fraction, i.e. high volume, e.g. overall or exterior volume, of the substrates to the overall interior volume of at least one and preferably all of the bio-remediation stages of the reactor such as at least about 10%, desirably at least about 50%, and preferably about at least 95% by volume. High packing fraction also generally prevents the formation of channels that permit air to channel through the reactor and avoid good mixing. During the course of treatment of the aqueous waste compositions, the dissolved oxygen will aid or react with the microorganisms to eradicate, attack, react, complex, and otherwise transform the waste compositions into odorless, detoxified, non-harmful or desired end products.

Another aspect of the reactors utilized in the present invention is that due to the above-noted parameters, shorter resident times are achieved that permit the microorganisms to bio-remediate or treat the waste compositions in the water. Thus, resident times of from about 2 hours to about 48 hours and generally from about 6 hours to about 24 hours are desired.

Due to the utilization of one or more air input chambers, the utilization of multiple perforated separators or support trays and hence multiple treatment stages, the utilization of one or more aqueous waste composition feed inputs, multiple different types of porous substrates containing multiple types of microorganisms, numerous different types of reactors can be utilized. Accordingly, it is to be understood that the following description of different reactors only refer to a few of the possible many different types of reactors.

Reference is now made to the drawings wherein like names/numerals refer to like parts throughout. Referring to FIG. 1, reactor R can be of any shape having a cross-section thereof that can be square, rectangular, cylindrical, and the like. The reactor contains solid outer walls 11 that are made of a corrosive-free material such as stainless steel and plastics. The reactor generally has a bottom chamber 18 that receives air or oxygen-containing gas under a slight pressure. Air is admitted to the reactor via an air pump, not shown, that supplies air through air supply pipe or conduit 1 and into the top of the reactor through reactor air inlet pipe 5 that is made of a corrosion-resistant material such as stainless steel or plastic. Air inlet pipe 5 is solid except at the bottom portion thereof that has openings or perforations 24 that admits the pressurized air into air pressure chamber 18. Air inlet pipe 5 is connected to reactor bottom plate 19 through connection 20 that can be a mechanical fitting, a weld, or the like. When the air flows into chamber 18 that generally extends throughout the bottom portion of the reactor, since it is under pressure it is forced through micro-porous diffuser 16 that has tiny openings so that the air is admitted into aqueous waste composition chamber 17 in the form of tiny bubbles. Micro-porous diffusers are known to the art and to the literature and are commercially readily available.

Figure 2:
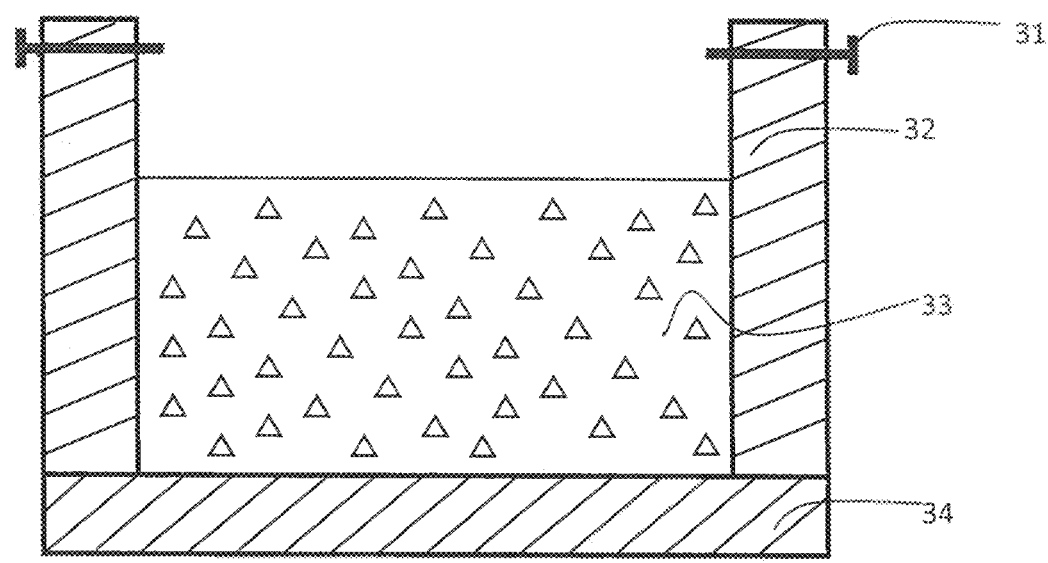
FIG. 2 is a cross-section elevation view of a ballast that can optionally be utilized in association with the reactors of the present invention.

Reactor R, that contains lift handle 8, can be inserted into any aqueous waste composition environment such as a pond, a holding tank, a sewage enclosure or other confined area. Reactor R can be free standing, that is, simply placed within the aqueous waste composition enclosure in which situation ballast can be added to the bottom portion of the reactor. FIG. 2 shows one type of ballast containing a corrosion-resistant bottom 34 have side walls or housing 32 that form an enclosure that contains a ballast material 33 such as concrete therein. The optional ballast can be secured to the bottom of reactor R as through bolts 31 or other fastening members. Alternatively, reactor R can optionally be attached to a support such as the wall of wastewater treatment tank through holding lug 7.

Figure 4:
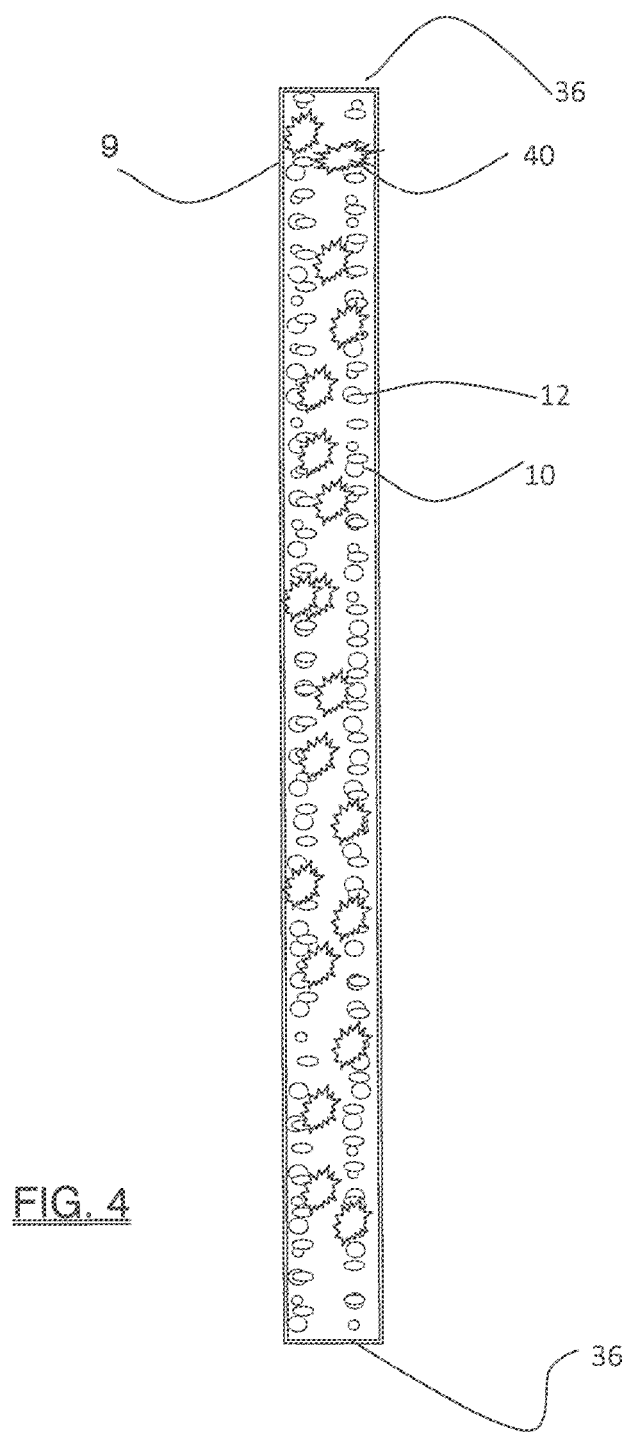
FIG. 4 is an elevation view of a chimney of the reactor of the present invention showing packing therein.

The aqueous waste composition is added to the reactor through wastewater inlet 21 that can be in the shape of an elbow having an opening at the other end thereof and optionally can be perforated. When placed in a tank containing an aqueous waste composition therein, the aqueous waste composition will flow into aqueous waste composition chamber 17 wherein it is mixed with air bubbles 10. The aqueous waste composition will be caused to flow upward through the reactor via drag forces due to forced air flow through the perforated air carrier pipe, chimney 9. That is, the concept of the reactor is a bottom input of air as well as the aqueous waste composition that is then caused to flow upward through various perforated separators 15A, 15B, 15C, etc., that have perforations 13 therein and thus through various stages of the reactor. The size of the various perforated openings in the separators is sufficient to allow air and water to flow therethrough but generally and desirably does not permit the packing substrates to pass therethrough. FIG. 4 shows various substrates with high surface area are placed in perforated chimney pipe 9 to create tortuous paths for air bubbles improve dissolving oxygen into wastewater.

Perforated separator 15A is a diffuser that allows bubbles 10 of air in aqueous waste composition 17 to flow upward therethrough (flow arrows 25) thus providing an additional mixing of the aqueous waste composition and the air bubbles so that some of the oxygen in the air is dissolved into the water.

As noted above, an important aspect of the present invention is that a plurality of multiple perforated separators exist to create a plurality of bio-remediation stages throughout the reactor such as anywhere from 2 to about 10 and desirably from about 3 to about 5 stages. The area formed between perforated separators 15A, 15B, and 15C, are identified as chamber 15AA, 15BB, 15CC, etc. The chambers 15AA, 15BB, 15CC, etc., are filled with packing substrate 30 that although can be only one type of packing but preferably is a plurality of different packings. That is, while each chamber formed between the various separators may contain only one type of packing, it is highly preferred that a plurality of different types of packings exist within reactor R and that a plurality of different packings also exist within each chamber 15AA, 15BB, 15CC, 15DD, etc.

In accordance with the above-noted aspects of the present invention, chamber 15AA contains packing substrates that are efficient in mixing the air bubbles and water to dissolve the oxygen within the water. Packing substrate 30A in accordance with the aspects of the present invention has high surface area and a high amount of pores having sizes as noted above. Located within packing substrate 30A is at least one type of microorganism with the proviso that the entire reactor R contains a plurality of microorganisms, i.e. at least two and generally several types such as from about 2 to about 300. Numerous microorganisms are utilized so that the reactor is efficient with regard to eradicating, detoxifying, complexing, or otherwise treating the various different types of waste contained with the aqueous waste composition and thus produce a very efficient reactor.

Since bubbles 10 are lighter than the water, they flow upward through chamber 15AA and cause the aqueous waste composition to flow upward so that continuous mixing of the air and the waste composition occurs thereby continuously causing dissolving of some of the oxygen into the water. The upward flow of the aqueous waste composition through the packing substrates 30A causes the dissolved molecular components of the waste composition to eventually contact a microorganism contained within the pores of the substrate whereby the waste composition molecule is bio-remediated. The process of mixing the air bubbles with the aqueous waste stream, the dissolving of oxygen into the water, and the contacting of various molecular components of the waste composition with microorganisms is continuous within each chamber 15AA, chamber 15BB, chamber 15CC, etc. in an environment wherein reactor R is not immersed in a body of water, e.g. a pond, but is fed via a pipe directly into the base of the reactor, the oxygen is dissolved into the water within each chamber and the amount of waste composition from one chamber to the next upper chamber is continuously reduced as the aqueous waste composition proceeds upwardly through the reactor. Because of the tortuous path that must be taken by the waste composition through the various packing beds and the inherent long residence time, the waste composition upon reaching the top of the reactor is essentially depleted of waste components. That is, the aqueous waste composition is treated so that only treated or highly treated water is emitted from the top of the reactor through perforated top plate 6.

The various perforated separators 15B, 15C, 15D, can be the same or different than perforated separator 15A. Generally, multiple substrates are contained within each chamber 15AA, 15BB, 15CC, so that the various stages, i.e. chambers 15AA, 15BB, 15CC, etc., treat a variety of components of the aqueous waste composition. With respect to the microorganisms, the same situation generally exists within each chamber. That is, while the entire reactor contains at least two different types of microorganisms, preferably a plurality exists within each chamber and the different chambers can contain a plurality of microorganisms that can be different but preferably are similar to the preceding or following chamber. In summary, the described reactor R shown in FIG. 1 constitutes a very efficient bio-remediation apparatus and process.

An optional but preferable aspect of the reactor of FIG. 1 is that it contains a chimney pipe 9 that has perforations 12 therein. Chimney pipe 9 can be located generally in the center of the reactor such as adjacent to input air pipe 5. In the embodiment of FIG. 1, there are two chimney pipes 9 located on either side of air pipe 5 with the chimney pipes being perforated 36 at the bottom thereof and also being perforated 36 at the top thereof at perforated top plate 6. Accordingly, air bubbles 10 and the aqueous waste composition can enter the bottom of chimney pipe 9 and flow upward through the pipe. That this upward flow that is not impeded by perforated separators 15A, 15B, 15C, etc., is important to producing continued circulation of the air and aqueous waste composition upward through the various chambers. Although chimney 9 can contain one or more packing substrates therein, as in FIG. 4, preferably it does not contain any substrates. Moreover, air bubbles within chimney pipe 9 exit therefrom into the various chambers and ensure additional mixing of the air with the aqueous waste composition and more importantly aid in diffusion of dissolved oxygen into the packed chambers of the apparatus from chimneys within the water.

Figure 3:
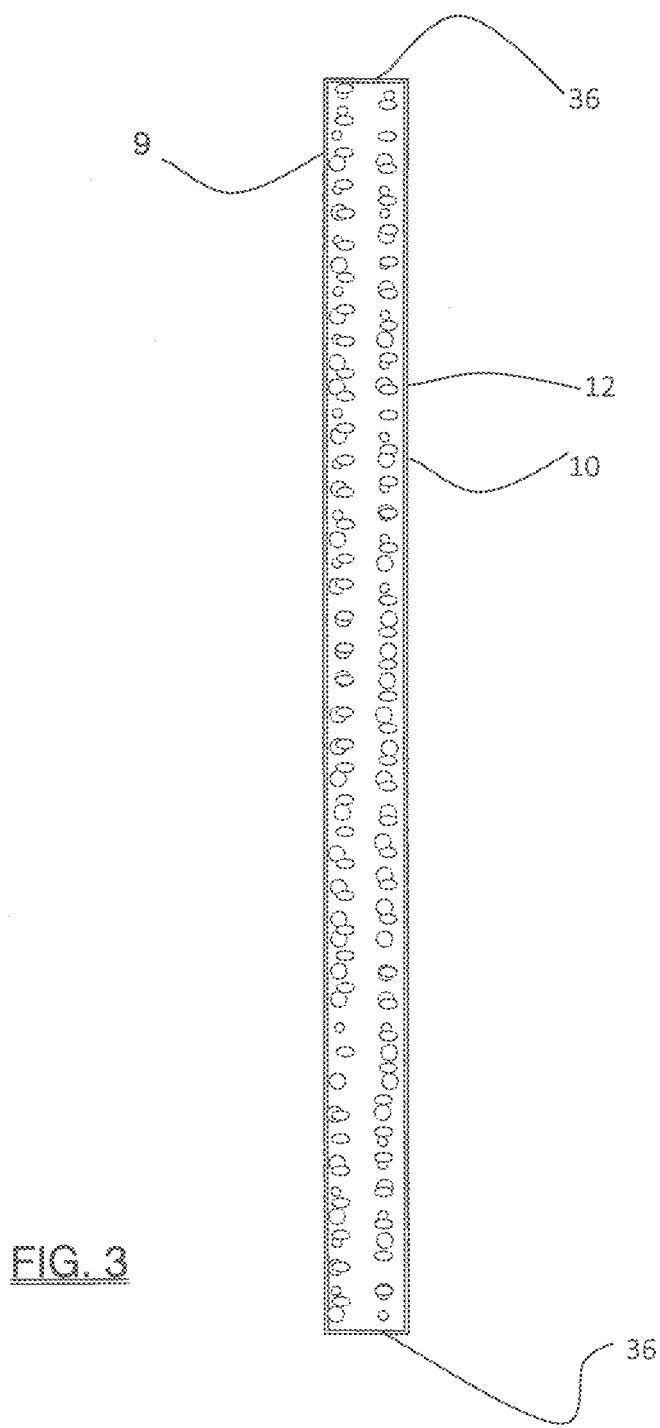
FIG. 3 is an elevation view of a chimney of the reactor of the present invention.
Figure 11:
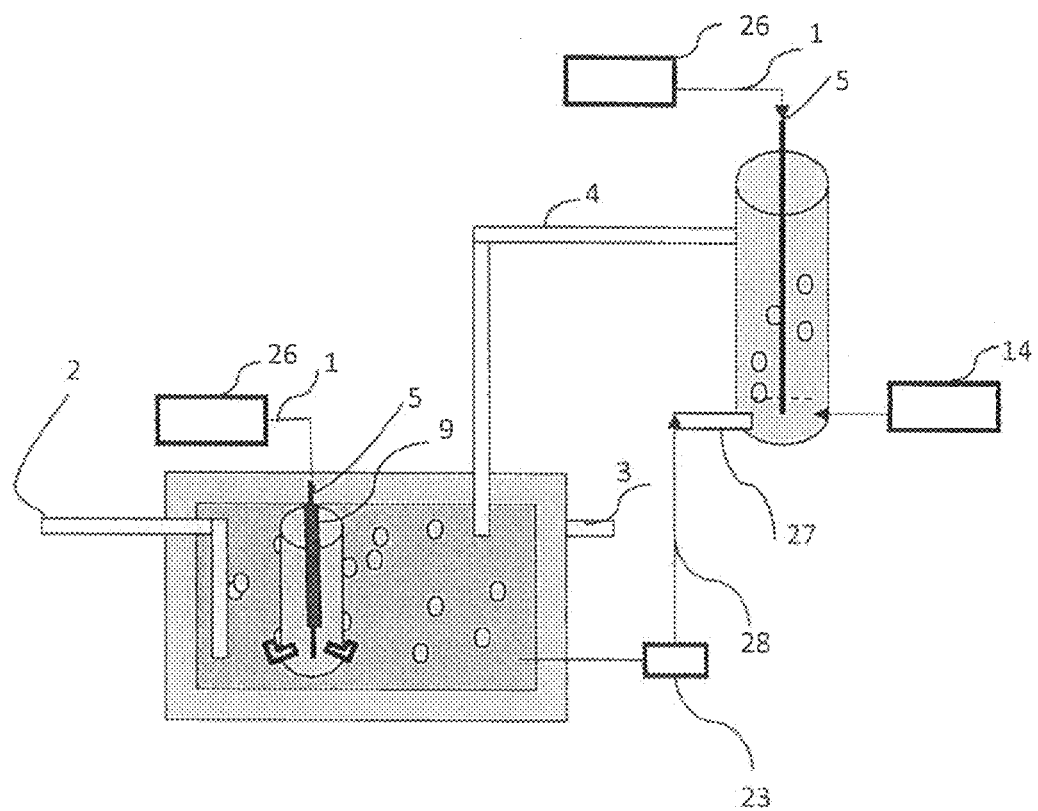

FIGS. 3 and 4 relate to side elevation views of chimney 9. The chimney has a plurality of perforations therein generally indicated by reference numeral 12 as being oval shaped. However, the exact shape of perforations 12 can vary so long as it generally is large enough to permit air bubbles and the aqueous waste composition with dissolved oxygen therethrough but to inhibit the passage of packing substrates 30 therethrough, as shown in FIG. 11. The top and bottom of the chimneys contain perforations 36.

Figure 5:
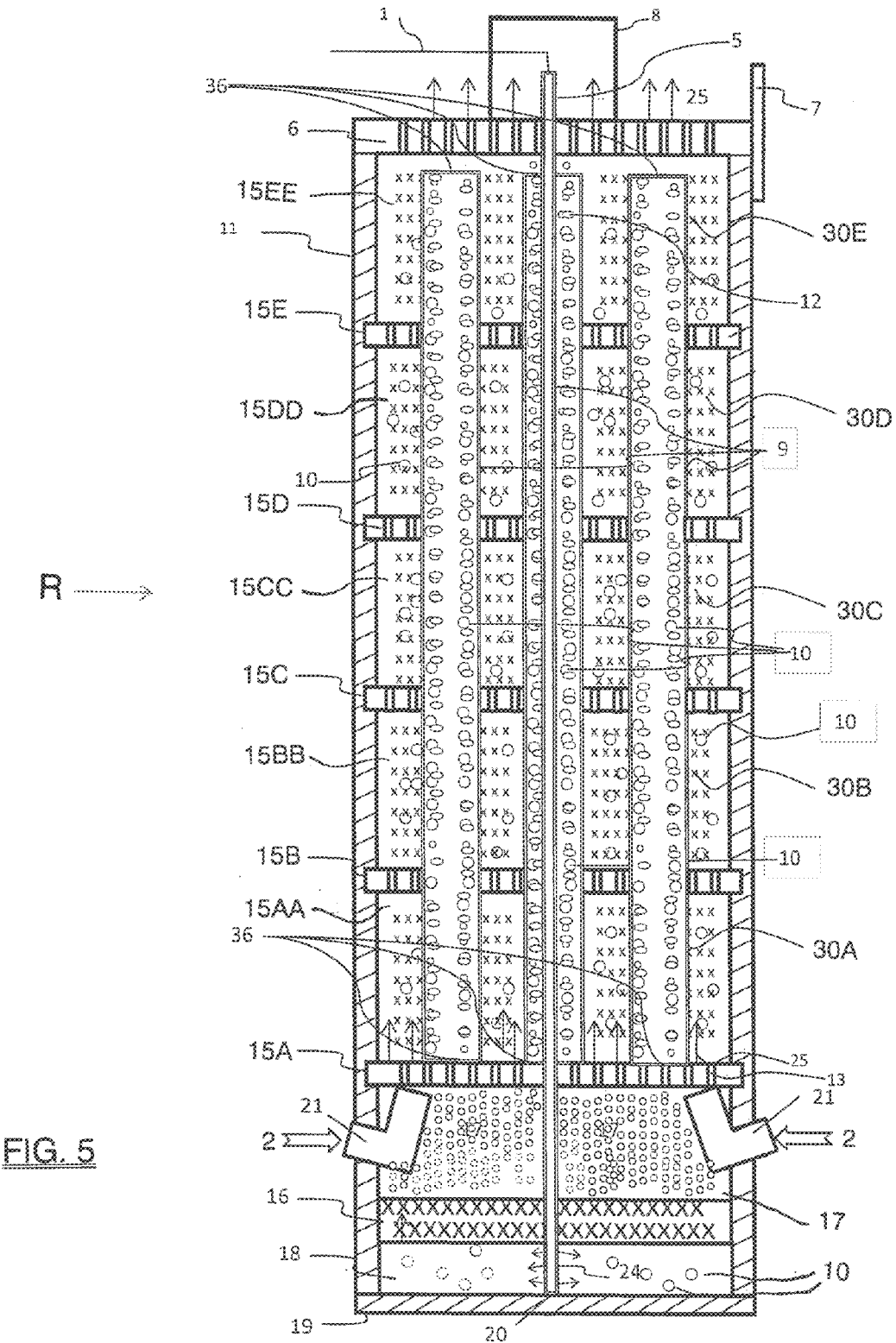
FIG. 5 is a cross-section elevation view of another treatment reactor of the present invention containing additional chimneys therein.

Another reactor of the present invention is shown in FIG. 5 that is very similar to FIG. 1 wherein like numbers represent like parts, and hence the various parts, composition, and process description thereof will not be repeated but rather is hereby fully incorporated by reference.

The reactor of FIG. 5 is different from FIG. 1 in that two additional chimney pipes 9 exist that are located laterally of the center chimney pipe 9. The additional chimney pipes are also perforated at their bottom 36 adjacent to separator 15A and at their top 36 adjacent to perforated top plate 6 so that air and aqueous waste composition can flow therethrough. As with the embodiment of FIG. 1, the additional chimneys serve to circulate air and aqueous wastewater throughout the various chambers 15AA, 15BB, 15CC, etc., to ensure further mixing of the air and water within the chambers and also to promote dissolving oxygen within the water, contact of the waste components with microorganisms, and the like.

Figure 6:
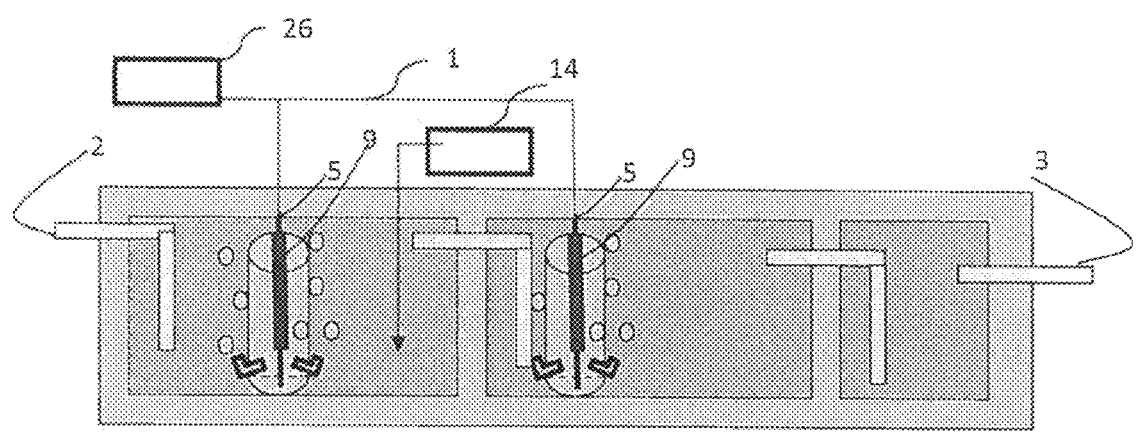
FIG. 6 is a cross-section elevation view containing reactors within a tank.

The embodiment of FIG. 6 relates to use of two reactors each contained within a separate tank to treat aqueous waste compositions therein whereby the aqueous composition of the left tank overflows into the composition of the center tank which then overflows into the right-hand tank and then out wastewater output line 3. More specifically, air pump 26 via air supply line 1 supplies air into the reactor of the left-hand tank as well as to the reactor of the center tank. The two tanks, independently, can be the same as the tanks described in FIG. 1 and FIG. 5. The operation of each separate tank is as set forth hereinabove with regard to FIGS. 1 and 5 and thus will not described for purposes of brevity but rather the above description thereof is fully incorporated by reference. Accordingly, each tank, independently, treats the aqueous waste composition within the tank and emits treated wastewater out of the top of the tank. The effluent within the left hand tank is cleaned and through an overflow pipe, is transferred to the center tank. Inasmuch as untreated aqueous waste composition is added through input pipe 2 to the left-hand tank, equilibrium is eventually reached. The effluent from the left tank that flows into the center tank is treated by the reactor in that tank and once again equilibrium is reached wherein the wastewater of the center tank has been bio-remediated such that the effluent thereof is substantially cleansed. The effluent from the center tank is then overflowed into the right-hand tank where it can be discharged.

Figure 7:
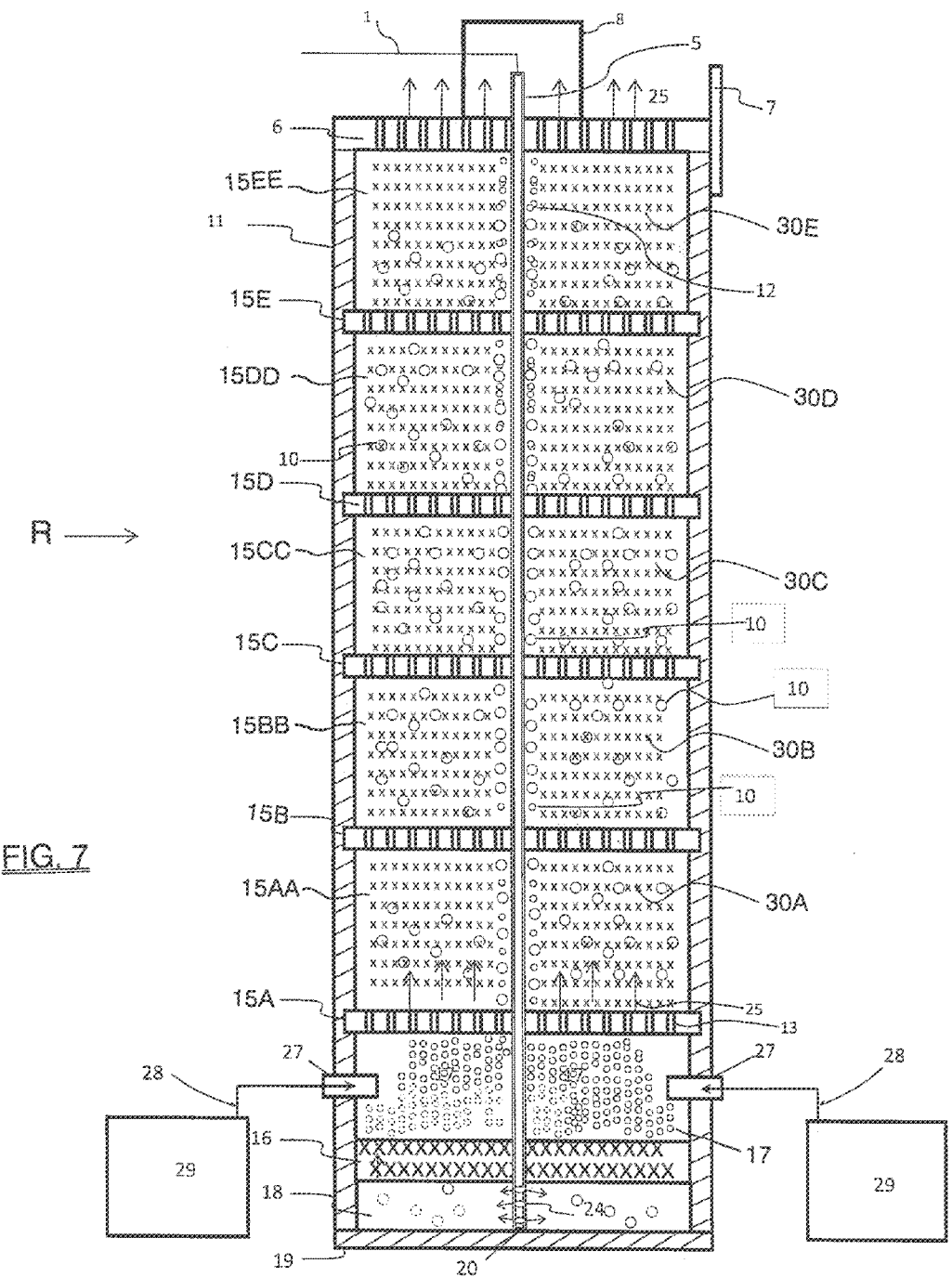
FIG. 7 is a cross-section elevation view of another treatment reactor of the present invention that contain no chimneys but utilizes a sump pump.

Another reactor embodiment is shown in FIG. 7 that is similar to the reactors shown in FIGS. 1 and 5. Accordingly, a great majority of the parts numbers in FIG. 7 are the same as in FIGS. 1 and 5 and thus the description of the parts as well as operation of the reactor of FIG. 7 are very similar to that of FIGS. 1 and 5 and hence will not be repeated but rather are hereby fully incorporated by reference with regard to the description as set forth in FIGS. 1 and 5. The reactor of FIG. 7 is different than the reactors in FIGS. 1 and 5 in that it does not contain any chimney pipes 9. Rather, sump pumps 29 pump the aqueous waste composition through wastewater inlet pipe 28 and subsequently through reactor inlet pipe 27 into aqueous wastewater composition chamber 17 where it mixes with incoming air bubbles from air pressure chamber 18. The reactor design of FIG. 7 is more efficient than the reactors set forth in FIGS. 1 and 5. Inasmuch as the reactor of FIG. 7 does not contain chimneys, flow of air and aqueous waste composition from chamber 17 will be forced to flow through the packing from chamber 15AA into chamber 15BB and subsequently into chamber 15CC, etc., and thus the residence time is prolonged. Longer residence time allows more air bubbles to be trapped by the packing substrates 30A, 30B, 30C, etc., to further enhance the level of dissolved oxygen, therefore bio-remediation. Thus, the effluent admitted from reactor of FIG. 7 is generally pure water.

FIGS. 8-20 relate to bio-remediation systems that utilize various reactors such as the types set forth in FIGS. 1, 5, and 7. All of the systems in FIGS. 8-20 contain various types of tanks that contain aqueous waste compositions that require remediation. Additional items include air pumps 26, sump pumps 29, optional nutritional and/or chemical feeding pumps 14 or essential nutritional or chemical feeding pump 35, and recirculation pumps 23. As should be apparent to those skilled in the art, the above combination of reactors, tanks, and various pumps result in a large number of systems that can be utilized all according to the present invention. For purposes of brevity, since the description of the various reactors have been described hereinabove, the components, operation and process thereof will not be repeated but rather is hereby fully incorporated by reference. As also should be apparent to those skilled in the art, FIGS. 8-20 relating to different bio-remediation systems can generally be described as flow diagrams that teach various combinations of the above-noted items of the present invention. Hence, a brief description of the various figures will be set forth. Such bio-remediation systems can generally be utilized in a large number of different applications such as industrial, commercial, municipal, and the like as noted hereinabove. Desirably the embodiments of FIGS. 6 and 8-15 can be used for septic tanks, grease interceptors, in lagoons, and ponds. The system set forth in FIGS. 16 and 17 can be used to treat industrial wastewaters whereas the embodiments set forth in FIGS. 18-21 are well suited for use in wastewater treatment plant aeration basins, pump stations, lagoons, and ponds.

Figure 8:
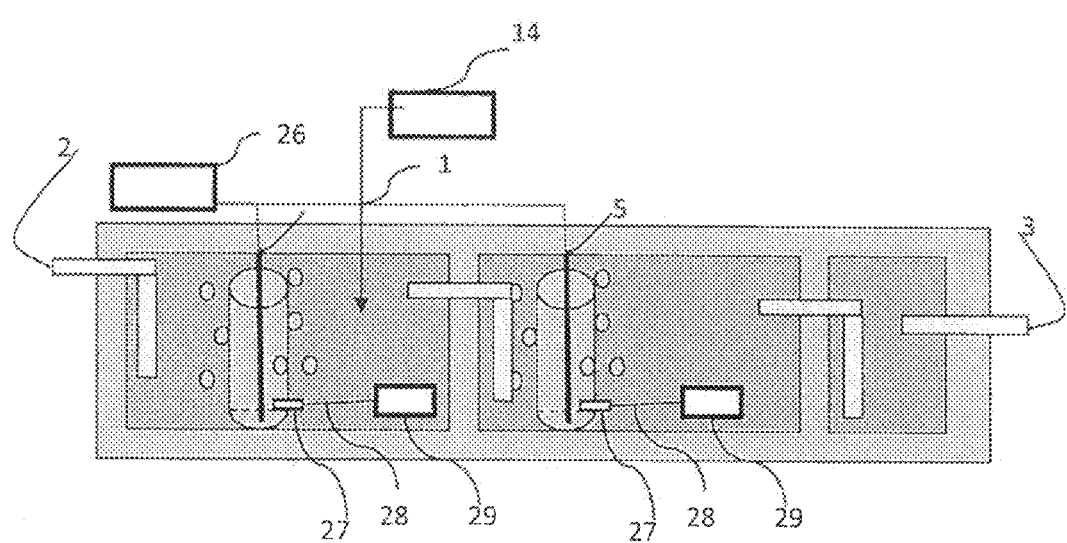
FIGS. 8 and 9 are cross-section elevation views of a tank containing reactors of the present invention therein.

FIG. 8 relates to a treatment system very similar to FIG. 6 except that the reactors of FIG. 8 are those as set forth in FIG. 7, that is, i.e. no chimneys. Accordingly, air pump 26 pumps air through air line 1 into the left reactor and the center reactor of FIG. 8. Both the left tank and the center tank of FIG. 8 contain sump pumps 29 therein that force the aqueous waste composition fluid through pipeline 28 and through reactor inlet pipe 27 into the bottom of the reactor. Bio-remediation thus occurs as described in FIG. 7 and thus will not be repeated but rather is hereby fully incorporated by reference. As with FIG. 6, the aqueous waste composition such as fats, oils, or greases as from a restaurant is pumped into the left tank wherein it is bio-remediated by the FIG. 7-type reactor. A portion of the treated aqueous waste composition of the left tank then overflows into the center tank of FIG. 8 wherein it is further bio-remediated by the reactor therein. Subsequently, a continuous amount of overflow of the treated aqueous waste composition of the center tank overflows into the right-hand tank wherein it can be further treated or not treated and is subsequently passed through outlet wastewater line 3. An optional aspect of FIG. 8 as well as FIG. 6 is that a nutrient and/or chemical pump 14 can be utilized to pump various nutrients into the left-hand tank such as sodium bicarbonate or calcium carbonate solution to adjust alkalinity for nitrifiers to oxidize ammonia-containing substances to nitrite and nitrate so that nitrification and denitrification can be achieved. Alternatively, pump 14 can be utilized to supply various chemicals to the tank to further treat the waste compositions therein.

Figure 9:
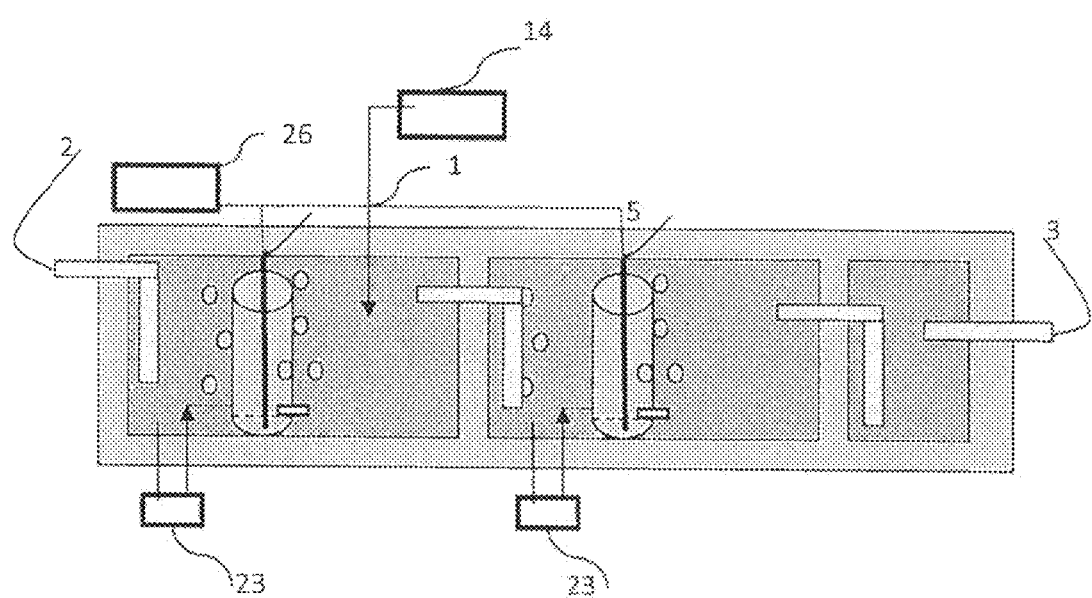

Referring to FIG. 9, the system thereof is similar to FIG. 8 except that instead of utilizing sump pumps 29 located within the tank, a portion of the aqueous waste composition in each tank is withdrawn from the tank and recirculated through external recirculation pump 23 and then to the bottom of the FIG. 7-type reactor.

Figure 10:
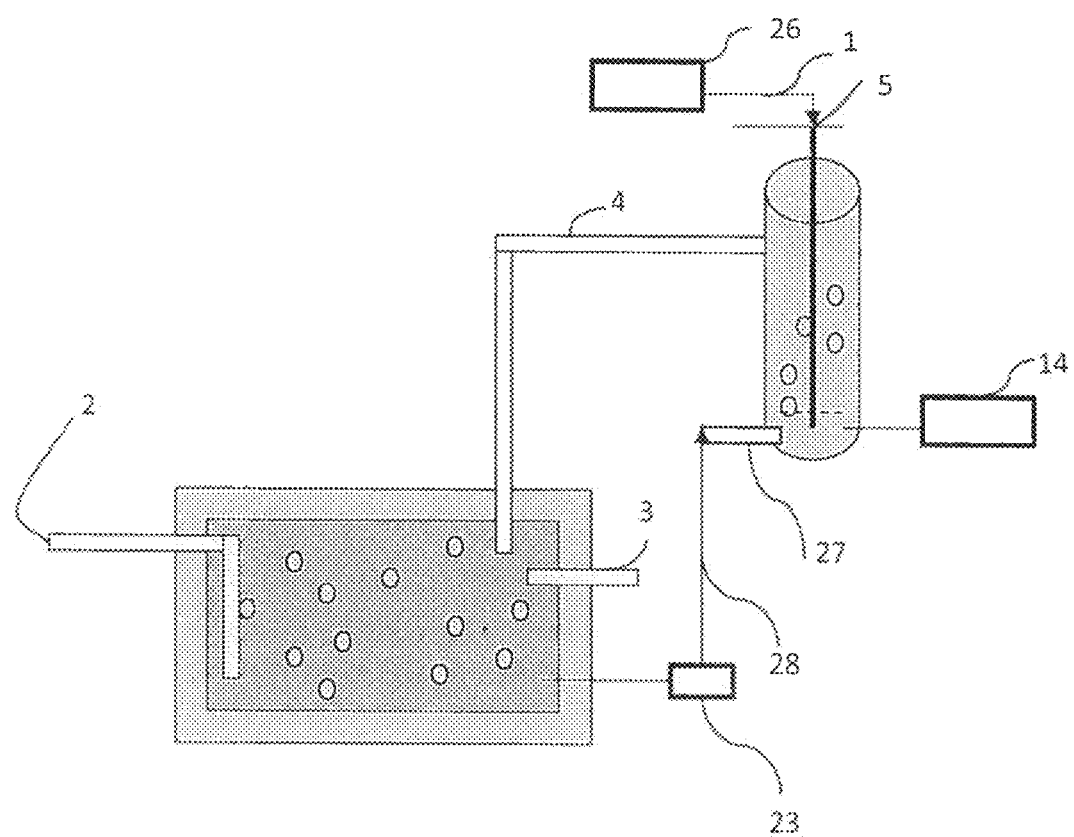
FIGS. 10, 11, and 12 are cross-section elevation views showing a bio-remediation tank containing an aqueous waste composition where a reactor outside of the tank is utilized.
Figure 12:
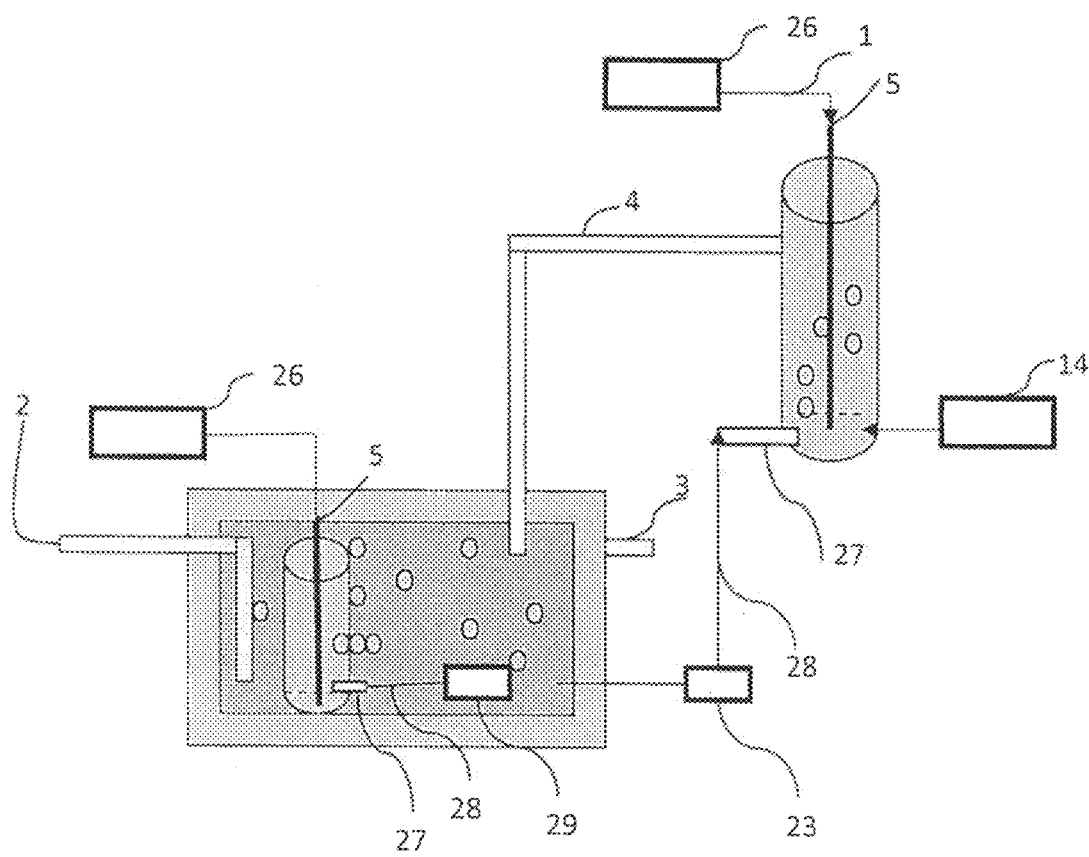

Similar bio-remediation systems are shown in FIGS. 10, 11, and 12. As apparent from the flow diagrams, an aqueous waste composition is withdrawn from the tank by recirculation pump 23 and is fed via inlet pipe 28 to reactor inlet pipe 27 wherein it is bio-remediated. The reactor is of the type set forth in FIG. 1 or 5 inasmuch as air is pumped into the reactor with the treated or bio-remediated waste composition being recirculated back into the tank via line 4. Optionally, nutrient or chemical compounds can be added to the reactor via pump 14. The system of FIG. 11 is similar to FIG. 10 except that additionally the tank contains a reactor of the type set forth in either FIG. 1 or 5 and thus has an air pump 26 that feeds air via line 1 into the reactor. The bio-remediation system of FIG. 12 is similar to that of FIG. 11 except that sump pump 29 is utilized to pump the aqueous waste composition in the tank via pipe line 28 into the reactor inlet pipe 27.

Figure 13:
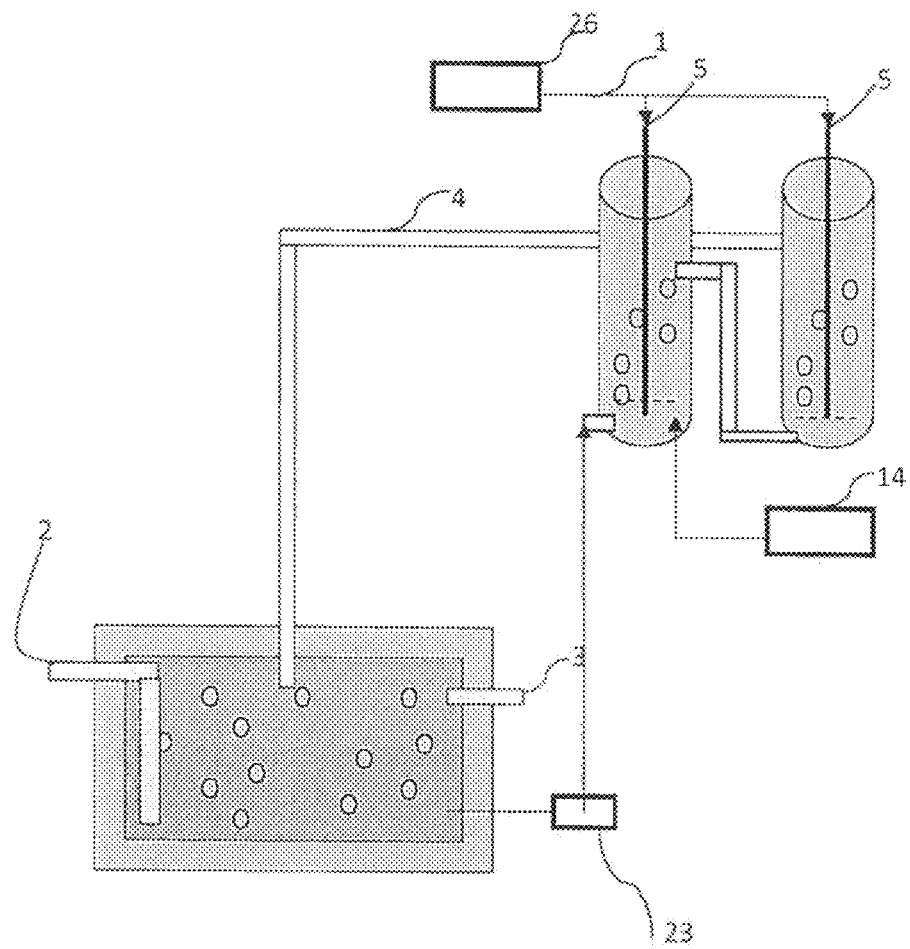
FIGS. 13, 14, 15, 16, and 17 are cross-section elevation views of different bio-remediation embodiments of the present invention wherein two reactors are utilized and are located outside a tank containing an aqueous waste composition therein.
Figure 14:
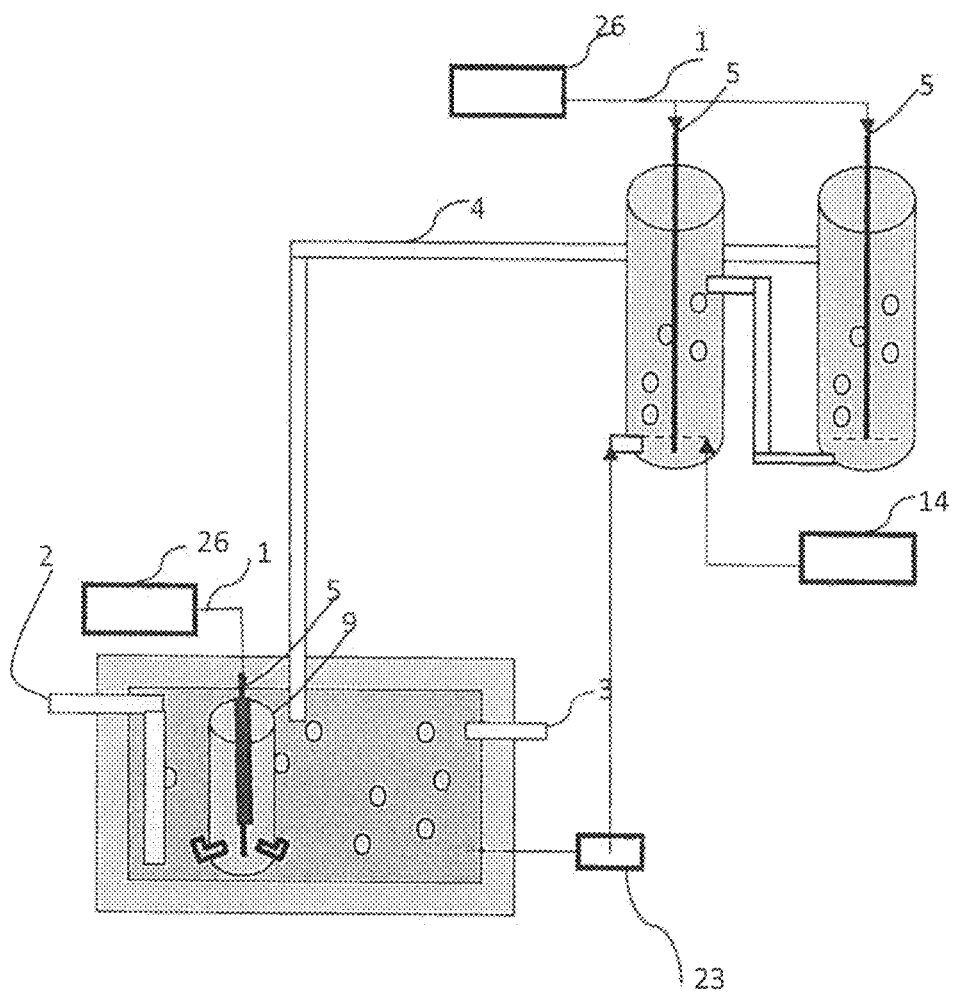
Figure 15:
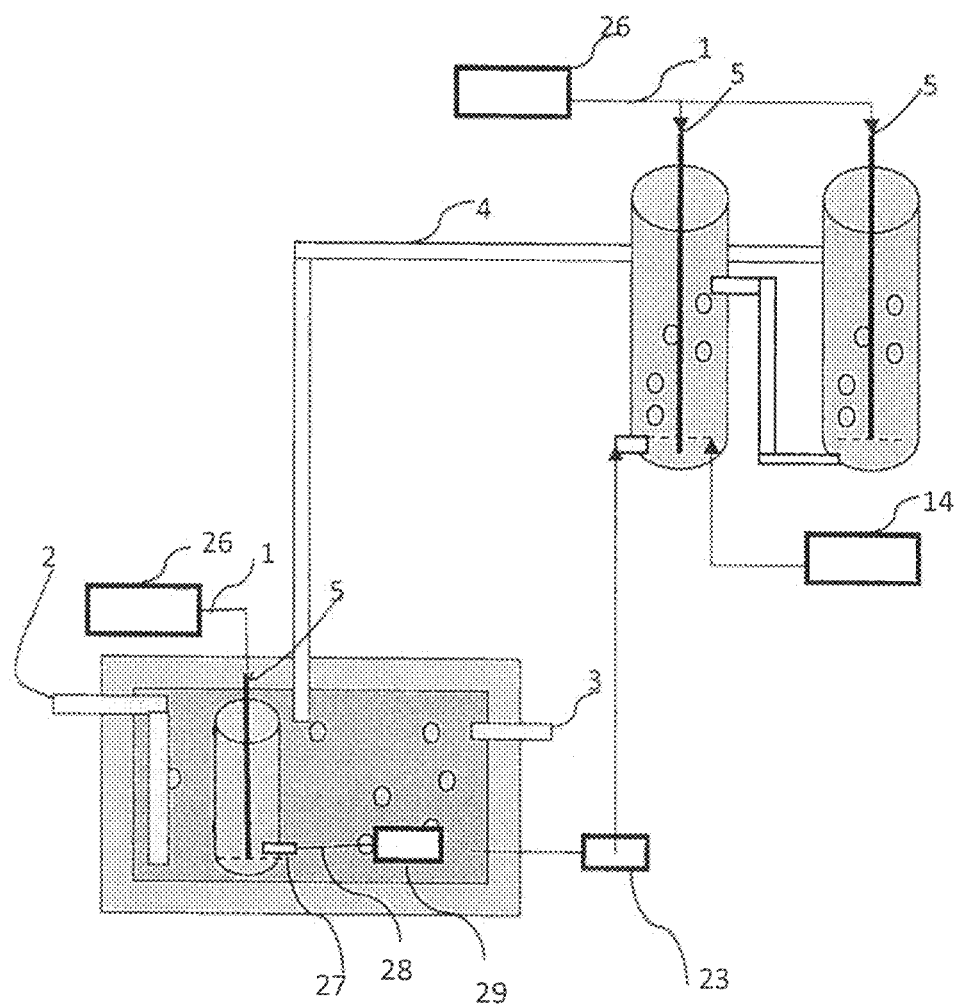
Figure 16:
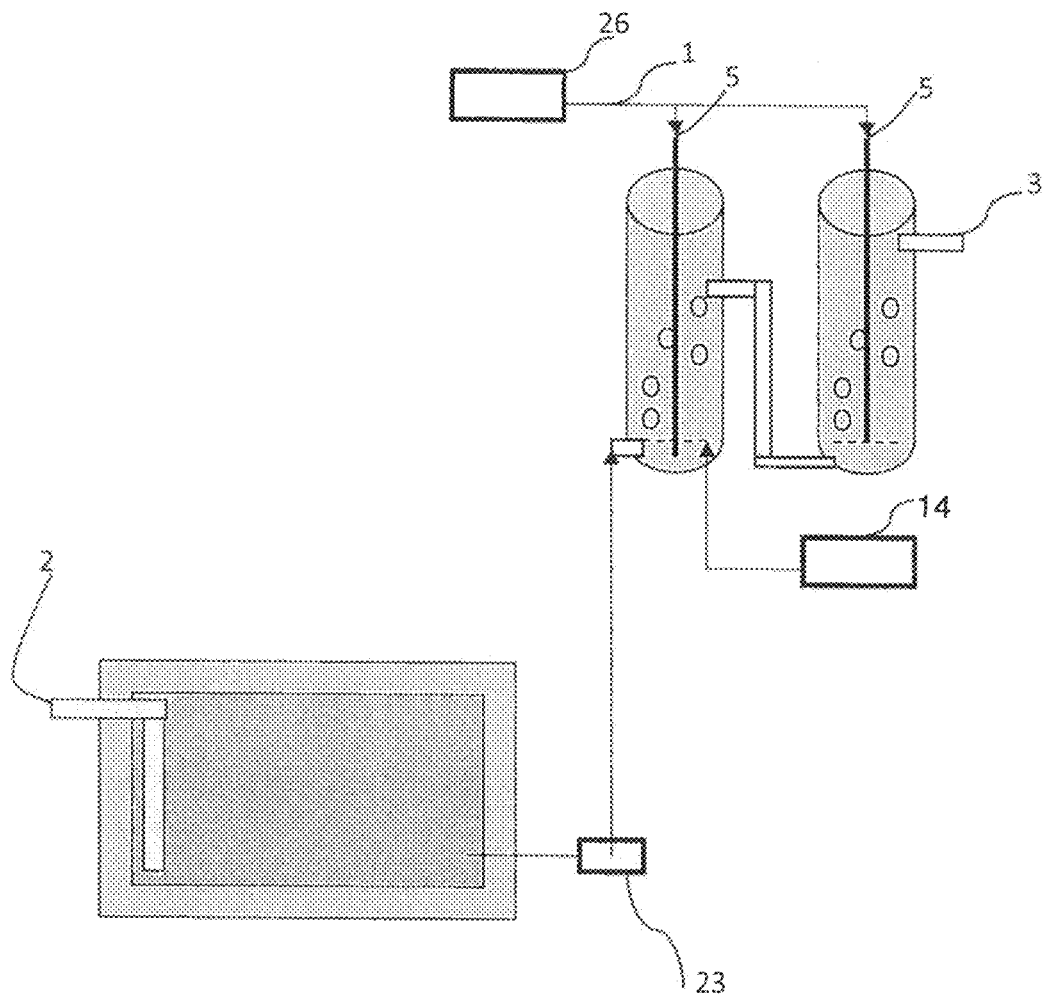
Figure 17:
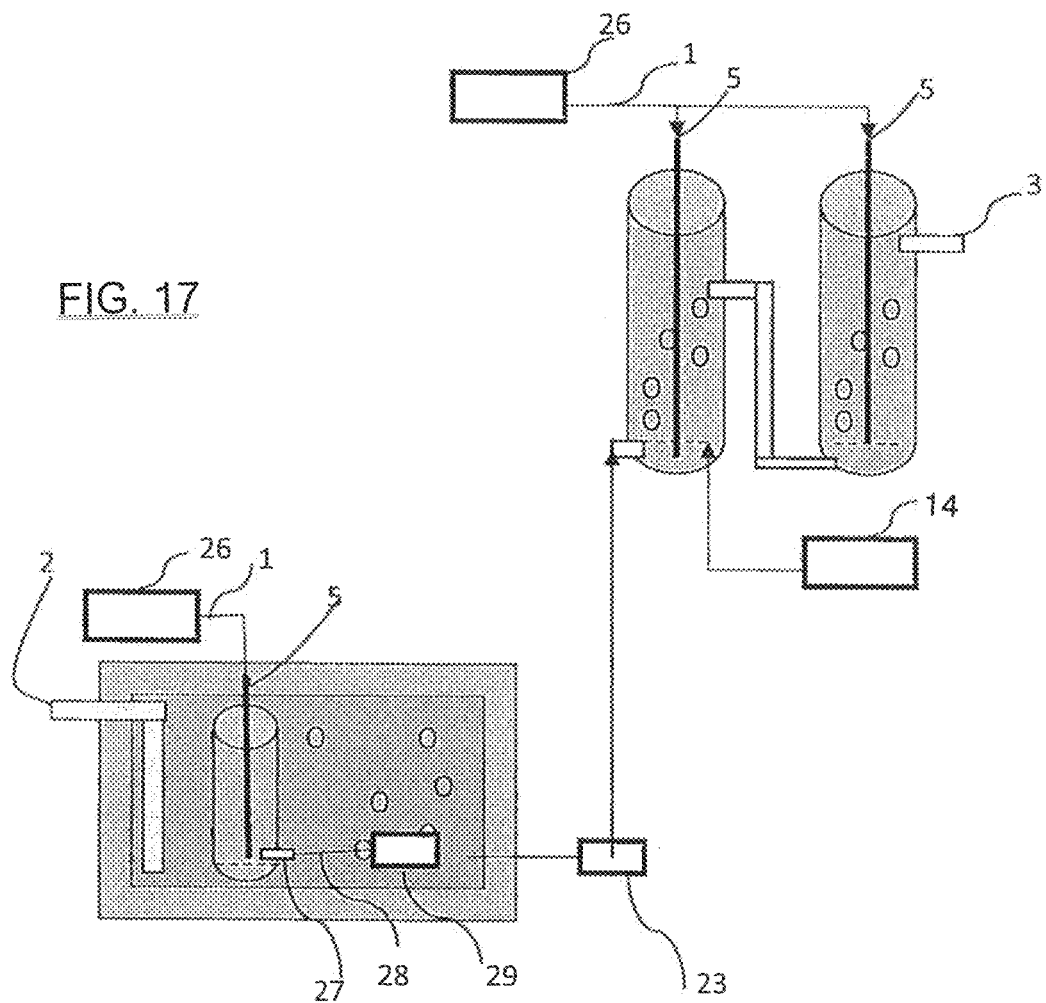

The bio-remediation embodiments of FIGS. 13-15 are similar. In FIG. 13, aqueous waste compositions are withdrawn from the tank and via recirculation pump 23 are fed to a first reactor and after bio-remediation therein, the effluent waste composition is fed to the bottom of a second reactor. Both reactors are air fed. Thus, both reactors are of a type set forth in FIGS. 1 and 5. The treated waste composition is then transferred from the second tank via water return line 4 to the tank. The process continues until all the waste composition in the tank has been treated so that the remaining water meets acceptable government regulations, etc. An optional aspect of each FIGS. 13-15 is the utilization of a nutrient and/or chemical pump 14 to pump such compounds into the bottom of the first tank. The system of FIG. 14 is similar to that of FIG. 13 except that additionally, it contains an air pump type reactor as described in FIGS. 1 and 5 wherein through air pump 26 and feed line 1 the air is admitted to the reactor that is located within the tank. The embodiment of system of FIG. 15 is similar to that of FIG. 14 except that sump pump 29 is utilized to pump the waste composition through feed pipe 28 into the reactor inlet pipe 27. The remediation system of FIGS. 16 and 17 are similar to FIGS. 13 and 15, respectively, except that instead of recycling the treated waste composition from the second reactor back to the tank, it is merely transferred out of the upper portion of the second reactor through outlet pipe 3 to any desired location. This system is proposed for industrial wastewater treatment in which industrial wastewater will contain unusual combinations of chemicals, hydrocarbons requiring special microorganisms to biodegrade. In these systems different types of microorganisms and their mutants can be housed in bottom-fed upward-designed packed column reactor.

Figure 18:
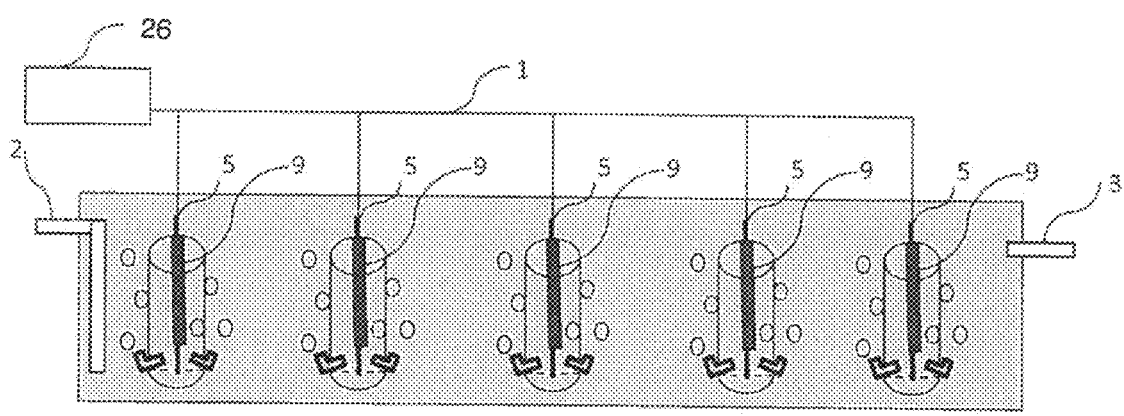
FIGS. 18 and 20 are cross-section elevation views showing additional bio-remediation embodiments of the present invention wherein five reactors are located within a tank containing an aqueous waste composition.
Figure 19:
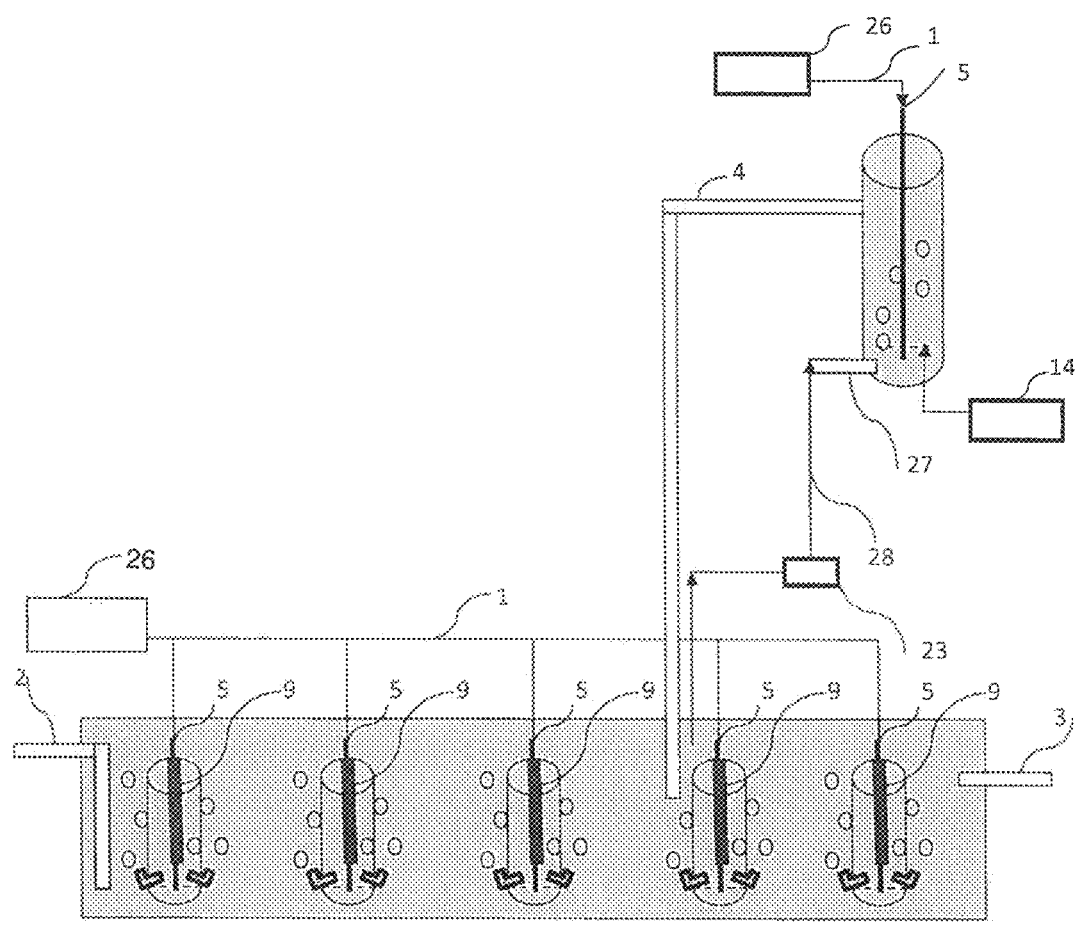
FIGS. 19 and 21 are a cross-section elevation view of further bio-remediation embodiments of the present invention wherein five reactors are located within an aqueous waste composition containing tank and one reactor is located outside of the tank.
Figure 20:
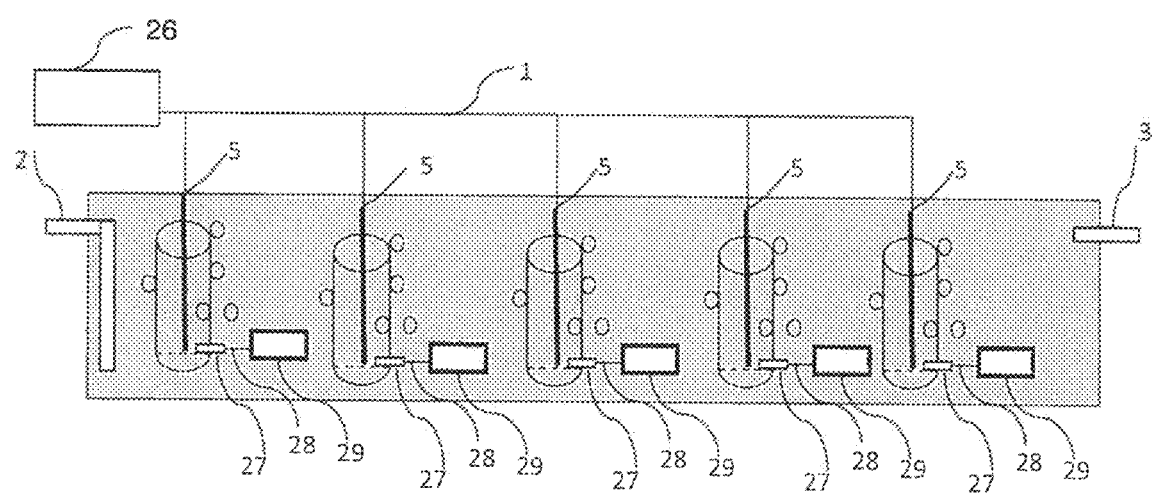
Figure 21:
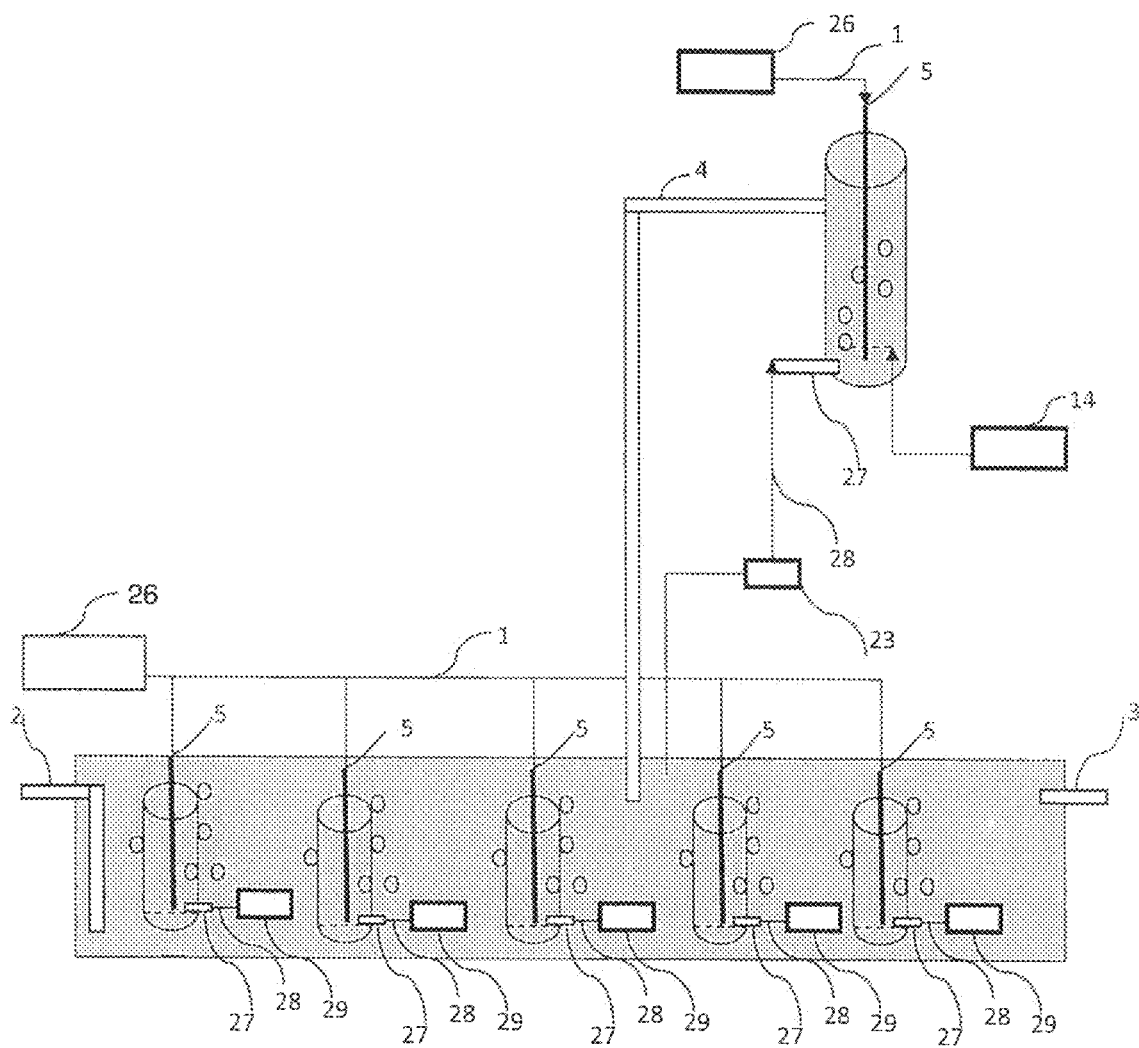

The bio-remediation system of FIGS. 18-21 is similar. In the system of FIG. 18, five reactors are contained in an elongated tank containing an aqueous waste composition. Air pump 26 feeds air into each of the five reactors that are of a type as set forth in either FIG. 1 or 5. Input of the waste composition is through tank inlet line 2 and the treated aqueous wastewater exits through outlet line 3. Naturally, each of the five reactors draws the aqueous waste composition into the bottom of the reactor and expels treated wastewater through the top of the reactor. Since the flow of the aqueous wastewater composition is from the left to the right of the elongated tank, each successive reactor will further cleanse the wastewater until it is treated at the right side of the tank and expelled through outlet line 3. The bio-remediation system shown in FIG. 20 as apparent from the flow diagram thereof is similar to that of FIG. 18 except that sump pumps are utilized with respect to each reactor to transfer the waste composition into the bottom of the reactor via pipe 28 and into reactor inlet pipe 27. The bio-remediation system disclosed in FIG. 19 as apparent from the flow diagram thereof is similar to FIG. 18 except that a portion of the aqueous waste composition is transferred via recirculation pump 23 and pipe line 28 to inlet pipe 27 of a reactor. The reactor has air pumped therein via pump 26 and line 1 and thus the reactor is of a type as set forth in either FIG. 1 or 5. After treatment in the reactor, the treated waste composition is recirculated back into the elongated tank. In this embodiment, once again nutrients or chemicals can be optionally added to the reactor via pump 14. The bio-remediation embodiment shown in FIG. 20 is very similar to that shown in FIG. 19 in that it includes a reactor located outside of the tank. However, in lieu of wastewater flow into the bottom of the reactors located within the tank, sump pumps 29 are utilized to feed the aqueous waste composition via inlet pipe 28 into reactor inlet pipe 27.

As should be apparent from FIGS. 8-21, numerous different types of bio-remediation systems exist according to the concepts of the present invention utilizing reactors having chimneys or reactors not having chimneys therein in association with various items such as sump pump, air pumps, nutrient pumps, additional reactors, and the like.

Another embodiment of the present invention is shown in FIGS. 22A, 22B, 22C, and 22D. Identical materials such as waste water and identical numbers therein generally refer to identical compounds, structures, packings, packing surface area, pore size, microorganisms, and the like, as set forth herein above, and the same is hereby fully incorporated by reference.

Figure 22A:
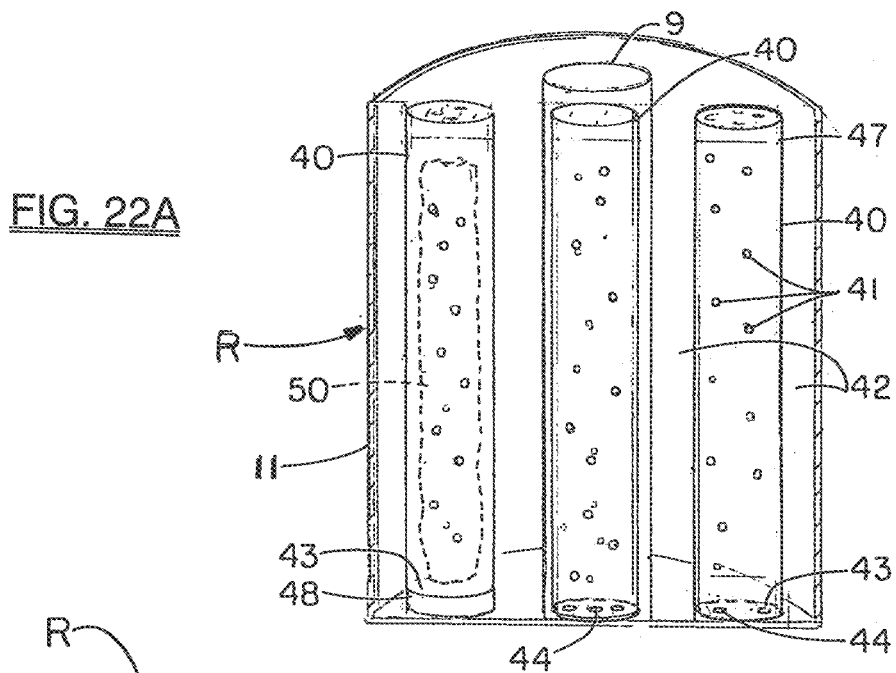
FIGS. 22A, 22B, 22C, and 22D relate to an embodiment wherein perforated separators such as 15A, 15B, 15C, etc. are not utilized but rather one or more perforated tubes that contain one or more packing substrates on one or more microorganisms. More specifically.
Figure 22B:
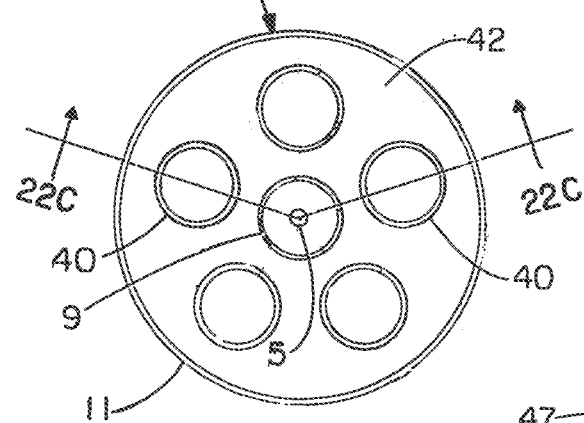
Figure 22D:
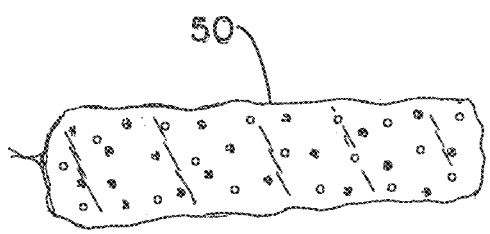
Figure 22C:
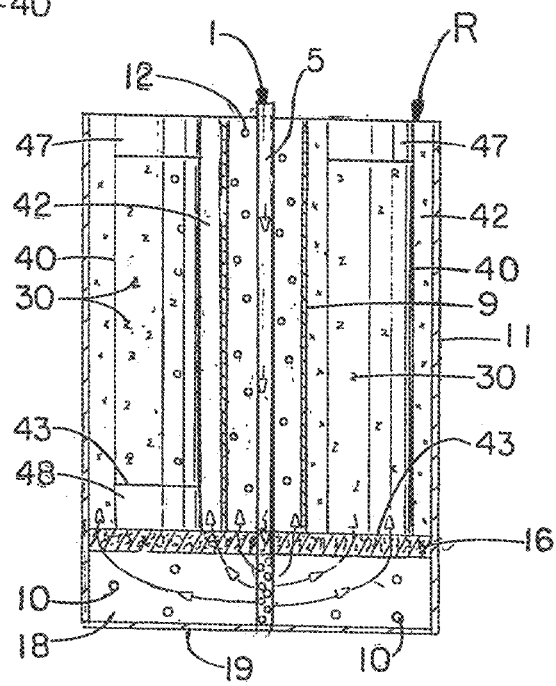

Reactor R comprises a housing that is an exterior barrier or wall 11 that confines the various components of the reactor shown in FIGS. 22A, 22B, and 22C. Reactor R generally is free of perforated separators 15 as shown in FIGS. 1, 5, and 7. By the term "free of", it is meant that at most only two or one vertically but separately located separators exist and preferably none, that is, no perforated separators exist.

The reactor can have any cross-sectional shape such as square, rectangular, cylindrical, oval, and the like. Air is admitted from an air supply line 1 to the reactor via an air pump, not shown, that supplies air through air conduit 5 located at the top of the reactor and extends to the bottom of the reactor to air chamber 18 wherein the end of the air conduit is perforated so that air containing oxygen can fill chamber 18. Since the air is under pressure, it is forced through micro-porous diffuser 16 that has tiny openings therein so the air is admitted into the reactor in the form of tiny bubbles 10. For purposes of clarity, air bubbles exist within the reactor in tube 40 and non-tube areas 42 but are not shown.

An important aspect of the present invention is that one or more tubes 40 are contained in each reactor and can be generally made out of various types of materials such as ceramics or metals, with polymers or plastics being preferred. In order to enhance mixing and dissolving of oxygen into the liquid waste material, the tubes have perforations 41 in the wall side portions thereof. The exact shape of the perforations is not important so long as they are large enough to permit the aqueous waste composition and air or oxygen to flow there through and to retain packing substrates therein.

Packing substrates 30 can be made out of many different types of materials such as minerals, carbon substrates, ceramics, metal substrates, polymers or plastics, and the like. Examples of such substrate materials are set forth herein above and are hereby fully incorporated by reference. An important aspect of the packing substrates is that they can be of any size, shape, and type that aids in dissolving high amounts of oxygen into the waste water. The amount of dissolved oxygen is at least 1 part by weight, desirably at least about 2 parts by weight, and preferably from about 3 parts to about 8 parts by weight per million parts by weight of the waste water.

Packing substrates 30 contained either within tubes 40 or within non-tube areas 42 can be the same or different as set forth hereinabove and fully incorporated by reference and have high average surface areas, are porous and have a large number of pores therein. The types of specific packing substrates will vary depending upon the type of aqueous waste water being treated. An important aspect of the invention is that multiple substrates are used. The different types of substrates 30 allow for microbes to adhere to the substrates that best suite them. Not only is a wide diversity of microbes created throughout the reactor, but also certain microbes are allowed to prosper on certain substrates over others. Preferably multiple types of packing substrates are utilized such as, independently, 2, 3, or 4, up to a large number such as about 10, 20, or 30 with typically from about 2 to about 5 or 10 being utilized.

The combination of the tubes having perforations on the side walls thereof with the packing substrates located within the tubes have been found to efficiently yield dissolved oxygen within the waste water and result in good bio-remediation thereof. The tube perforations also permit air and liquid waste to flow into and out of the tubes.

While non-tube areas 42 of the reactor, independently, can contain multiple types of more packing substrates 30, it is desired that they contain only one type of packing substrate therein. The advantages of utilizing only one type of substrate exists during maintenance of the reactor. During maintenance the removal of substrates without mixing is important. Having a single type of substrate guarantees that there will be no mixing upon removal and that the non-mixed substrate can be re-used in the future in the same or different reactor. Having control of substrate quantities is also important to the effectiveness of the reactors. When substrates mix, control is lost. The specific type of a packing substrate in non-tube areas 42 will also vary with the composition and types of waste water being treated.

At least one tube, desirably a majority, and preferably all tubes are open at the top end thereof so that the air and dissolved oxygen can readily exit the tubes and further promote good mixing in the upper portions of the tube. Thus, a dead oxygen zone is prevented.

Desirably, most, and preferably all of the tubes have perforated bottom, horizontal wall portions 43 of a size that retain the packed substrates therein but freely allows the aqueous waste and air to pass there through. Bottom wall perforations 44 thus permit air as from chamber 18 and micro diffuser 16 to migrate into the bottom of the tubes 40 such as the center tube 40 of FIG. 22A. This aspect immediately promotes good mixing of the air and dissolving oxygen into the liquid waste as well as to increase the concentration of the microorganisms to promote bio-remediation. This aspect is also shown in FIG. 22C at the bottom right hand portion thereof.

In the bottom left hand portion of FIG. 22C, an embodiment is shown wherein tube 40 that has perforations 44 on the bottom horizontal end wall 43, resides upon cylindrical bottom cap 48 that is open at the top end thereof. However, the bottom portion of bottom cap 48 does not have perforations. When the type of packing substrate utilized that is somewhat degradable such as those derived from natural materials, for example carbon substrates such as charcoal, coal, wood chips, etc. they can deteriorate during use and break up into very fine particles and settle into bottom cap 48 as dust, fine debris, and the like. Rather than to remain within the reactor, tube 40 can be removed along with cap 48 with the dust therein removed from the tube. If the packing substrates are degraded, or when setting of the packing substrates occur, top cap 47 can be removed and additional packing added to the tube. Tube 40 and bottom cap 48 can then be placed back in the reactor. These operations promote oxygen dissolving efficiency of the reactor over extended periods of time. Bottom caps 48, independently, can be removable or non-removable from the various tubes.

Cap 47 closes the top end of the tube at a vertical distance above the reactor waste water level and thus prevents the packing substrates from being discharged therefrom as upon a tipping of the reactor. Caps 47 preferably have perforations at the top portion thereof that, as with perforations on the side wall of the tubes, retain the packing substrates within the tubes but readily permit the flow of gas such as air therethrough. The caps can be made of the same material as a tube and can be attached thereto in any suitable manner such as via friction fit, a threaded engagement, and the like. Optionally, the tubes need not have a cap, but this aspect is not desired.

Another embodiment of the present invention is shown in FIG. 22D wherein a porous sock 50 is utilized to retain one or more types of packing substrates therein. Preferably only one type of substrate is utilized in each sock. Moreover, multiple socks 50 can be stacked on top of each other within each tube 40 where each sock 50 can contain only one but a different type of substrate. Socks allow substrates to pre-inoculated with microorganisms via hanging them in existing waste waters with active aerobic microorganisms. The use of socks also allow for examination of how much of a specific type of a mineral substrate depletes over time. The durability of a mineral substrate can also be tested as by assessing the weight differential of a sock from the initial assertion to its actual removal (potential degradation) after use.

The sock can be conveniently located in one or more tubes 40 and contain a partial amount of the packing substrates located within a tube or envelop all of them. Part or all of the packing material therein can thus be conveniently removed without removing tube 40 from the reactor. An advantage is that all or part of the packing in an individual tube can be removed and replaced with different types of packing substrates as when the environment of the liquid waste has been changed. Another advantage is that tube can be repacked with different microorganisms. Of course, air and the liquid waste material can flow in and out of the sock.

Sock 50 can be made out of any type of material that generally is not readily degradable such as polymers, and natural fibers.

Desirably, the reactor contains at least one chimney 9 having perforations 12 in the sides thereof as well as in the top and bottom horizontal end portions thereof. While the chimney can contain packing substrates, preferably it is substantially free of any substrates. That is, the amount of any substrate within the chimney is generally less than about 20%, or less than about 10%, desirably less than about 5%, and preferably less than about 2% by volume, and most preferably none. Use of packing above these amounts will significantly reduce the effectiveness of the reactor unit and require maintenance to remove the various packing substrates.

The use of a chimney is essential to the efficient operation of Reactor. The chimney permits air as from air supply line 5 to travel unimpeded from air pressure chamber 18 upwardly to the top of the reactor and thus exerts a constant upward pull on the waste water. In other words, the generally unimpeded bubbling of the air through the one or more chimneys creates an upward draft forcing the waste water to move more quickly through the system and also encourages mixing of the waste water with the packing substrate containing the microorganisms thereon that results in a shorter residence time, greater amounts of dissolved oxygen into the waste liquid, and enhanced bio-remediation. The liquid waste can freely enter the chimney and mix with the oxygen therein as well as flow out of the chimney into the surrounding reactor area.

The operation of the reactors set forth in FIGS. 22A-D is similar to that as set forth above with respect to the multistage reactors and thus is hereby fully incorporated by reference. By way of summary, perforated tubes 40 are filled with packing substrates that have or are subsequently treated with desired microorganisms that are attached, bonded, or otherwise applied thereto. Multiple different types of substrates 30 can, independently, be utilized in the one or more tubes, as well as multiple different types of microorganisms, independently, in the one or more tubes to bio-remediate liquid waste. The non-tube reactor areas 42 also have packing substrates added thereto that are, independently, coated or contain one or more different microorganisms. However, these packing substrates are preferably of only one type as noted above.

Subsequently, the liquid waste is added to the reactor and air from air supply 1 is added via air pipe 5 to air chamber 18.

The air, being lighter than water, naturally will flow upwardly through the various tubes, the non-tube reactor area, as well as chimney 9 resulting in thorough mixing and dissolving of the air and oxygen into the waste material with bio-remediation occurring through the upward flow. Multiple different types of microorganisms are utilized in order to bio-remediate various types of compounds in the liquid waste. When one type of waste compound is in large supply, the number of microorganisms will grow to digest and eradicate the same. As noted, the microorganisms are preferably bound to the pores or substrates so that they are not washed away or flow out of the reactor. Due to generally high dissolved levels of oxygen of the present invention and lengthy retention times, the liquid waste is generally treated upon reaching the top of the reactor. Generally, upon subsequent treatments in additional reactors, typically it can be fully treated. Purification occurs upon subsequent disinfection by any convention system and/or process.

If the packing in a particular tube not containing a sock is degraded, the lever thereof will decrease and additional packing can simply be added to the top of the tube so that it is fully packed. If the sock is utilized in a tube, the reduced level of a packing can be corrected by opening the sock and adding more packing thereto. Another option is to simply replace the sock with a new one.

As noted, the utilization of bottom caps 48 serve to collect the degraded or dust-like packing and thus not block but rather permit air to enter through the bottom of a particular tube. Upon extended use of the reactor, various individual tubes can be removed, repacked, and reinserted into the main body of the reactor. However, in order to be able to remove a tube, the substrate surrounding all of tubes found within the non-perforated reactor housing 11 desirably must be removed. If the substrate from the non-tube areas 42 are not removed, the surrounding substrate will fill in the void space left by the removed tube thereby inhibiting a new tube or the same one from being reinserted. Alternatively, if sock 50 is utilized, the packing contained therein can be removed, repacked, and then inserted back within the tube without having to remove the tube from the reactor.

Since separators as set forth in FIGS. 1, 5, and 7 are not utilized in reactor tube embodiments, easy or ready access to replace selected or all the different types of the substrates in the reactor is available. For example, upon maintenance or changing the types of one or more microorganisms utilized and/or one or more packing substrates, the individual tubes that contain a sock can be serviced without removing any of the remaining packing substrates and/or microorganisms. Thus, a quick and efficient changing operation is achieved, as for example, with respect to a changing waste water environment. The changing of limited amount of the packing substrates instead of the entire reactor contents also results in less moving, frictional contact of the various packing substrates, and the like that results in less breaking of the various packing substrates. Other advantages include that the reactor can be adapted to the waste water environment. Additionally, one type of substrate can be removed and replace with a more efficient substrate in a given environment. Another advantage is reduced down time with regard to changing the packing thus increasing treatment time of the waste water.

The tube reactors 40 of the present invention as for example shown in FIGS. 22A through 22D can be substituted partially or totally for the various multiple chamber reactors, as discussed hereinabove, as for example shown in FIGS. 6, and 8-13 whether the tube reactors are located in a tank, container, or the like or in a natural environment such as a pond, lake, etc., or outside thereof. Moreover, the use of the tube reactors can be utilized with various types of recycled bio-remediation systems such as those shown in FIGS. 6, and 8-13. Accordingly, the description of the various bio-remediation systems such as shown in FIGS. 6, and 8-13 are hereby fully incorporated by reference and are not repeated for purposes of brevity.

While in accordance with the patent statutes, the best mode and preferred embodiment have been set forth, the scope of the invention is not limited thereto, but rather by the scope of the attached claims.

What is claimed is:

1. An apparatus for the bio-remediation of an aqueous waste composition, comprising:
    a reactor having one or more side wall perforated bio-remediation tubes, at least one of said perforated bio-remediation tubes, independently, having therein one or more different types of tube packing substrates, said substrates being porous and having micro-pores therein;
    said reactor having a non-tube reactor area comprising one or more different types of non-tube packing substrate therein, said non-tube packing substrates being porous and having micro-pores therein;
    said reactor having multiple types of different microorganisms therein, said different multiple microorganisms, independently, being attached to said tube packing substrates and to said non-tube packing substrates;
    said reactor having at least one perforated chimney pipe, said at least one chimney pipe being substantially free of packing substrates;
    said reactor having an inlet capable of admitting an aqueous waste composition to said reactor,
    said reactor having an inlet capable of admitting oxygen to said reactor; and
    said reactor having an outlet.

2. The apparatus of claim 1, including a plurality of said side wall perforated bio-remediation tubes, wherein an average surface area of said tube and said non-tube packing substrates, independently, is from about 100 to about 200,000 square meters per cubic meter, and wherein an average pore size of said packing substrates is from about 1 micron to about 500 microns.

3. The apparatus of claim 2, wherein less than about 10% by volume of said at least one chimney pipe contains packing substrates therein, and said reactor being free of vertical spaced perforated separators in said perforated bioremediation tubes.

4. The apparatus of claim 3, said reactor being free of vertically spaced perforated separators in said non-tube reactor area, and wherein a plurality of said perforated bioremediation tubes have bottom wall perforations.

5. The apparatus of claim 4, wherein said oxygen is admitted to the reactor, wherein said chimney pipe has bottom wall perforations, wherein less than about 5% of said chimney pipe volume contains packing substrates therein; wherein all of said perforated bioremediation tubes contain a tube packing substrate therein; wherein all of said perforated bio-remediation tubes contain multiple microorganisms on said tube packing substrate; wherein all of said side wall perforated tubes have a perforated bottom wall; and wherein said perforated bioremediation tubes and said non-tube reactor areas, independently, have only one type of packing substrate therein, and wherein said microorganism comprises a *pseudomonas* species comprising *Pseudomonas vesicularis, Pseudomonas putida, Aeromonas hydrophila, Brevibacterium acetylicum*; a *Nitrobacter* species comprising *Nitrobacter winogradskyi*; a *Nitrosomonas* species comprising *Nitrosomonas europaea*; a sulfur containing compound comprising *Thiobacillus* species or *Thiobacillus denitrificans*; a fungi that naturally exists in mushrooms, yeasts, and molds; or a protozoa comprising *sarcomastigophora, labyrinthomorpha, apicomplexa, microspora, acetospora, myxozoa,* and *ciliophora*; or any combination thereof.

6. The apparatus of claim 5, wherein a plurality of said perforated bioremediation tubes have a cap located at the bottom of said tube; wherein said chimney pipe contains no packing substrates therein, wherein the average surface area of said tube and said non-tube packing substrates, independently, is from about 500 to about 10,000 square meters per cubic meter, wherein said average pore size of said packing substrate is from about 20 micron to about 100 microns, and wherein said packing substrate comprises a mineral, a carbon substance, a ceramic, a metal, a polymer or a plastic, or any combination thereof.

7. The apparatus of claim 1, including a perforated sock in at least one of said one or more perforated bioremediation tubes, wherein said sock perforations are of a size to retain said tube packing substrate therein; and wherein less than about 10% of said chimney pipe volume contains packing substrates therein.

8. The apparatus of claim 4, including at least one perforated sock in a plurality of said perforated bioremediation tubes, and wherein said sock perforations are of a size to retain said tube packing substrate therein.

9. The apparatus of claim 6, including at least one perforated sock in each said perforated bioremediation tubes, and wherein said sock perforations are of a size to retain said tube packing substrates therein.

10. The apparatus of claim 1, wherein an average surface area of said tube and said non-tube packing substrates, independently, is from about 100 to about 200,000 square meters per cubic meter, wherein an average pore size of said packing substrate is from about 1 micron to about 500 microns, wherein said packing substrate comprises a mineral, a carbon substance, a ceramic, a metal, a polymer or a plastic, or any combination thereof; and wherein less than about 2% of said chimney pipe volume contains packing substrates therein.

11. The apparatus of claim 10, wherein the average surface area of said tube and said non-tube packing substrates, independently, is from about 500 to about 10,000 square meters per cubic meter, and wherein said average pore size of said packing substrate is from about 20 micron to about 100 microns.

12. The apparatus of claim 6, wherein said microorganism comprises a compound that is cellular and is able to replicate without a host cell.

13. The apparatus of claim 10, wherein said microorganism comprises a *pseudomonas* species comprising *Pseudomonas vesicularis, Pseudomonas putida, Aeromonas hydrophila, Brevibacterium acetylicum*; a *Nitrobacter* species comprising *Nitrobacter winogradskyi*; a *Nitrosomonas* species comprising *Nitrosomonas europaea*; a sulfur containing compound comprising *Thiobacillus* species or *Thiobacillus denitrificans*; a fungi that naturally exists in mushrooms, yeasts, and molds; or a protozoa comprising *sarcomastigophora, labyrinthomorpha, apicomplexa, microspora, acetospora, myxozoa,* and *ciliophora*; or any combination thereof.

14. A bio-remediation treatment system comprising at least one recirculation line, and at least one reactor as set forth in claim 1.

15. A bio-remediation treatment system comprising at least one recirculation line, and at least one reactor as set forth in claim 4.

16. A bio-remediation treatment system comprising at least one recirculation line, and at least one reactor as set forth in claim 8.

17. A bio-remediation treatment system comprising at least one recirculation line, and at least one reactor as set forth in claim 9.

18. A process for the bio-remediation of an aqueous waste composition, comprising the steps of:
    feeding said aqueous waste composition to a reactor or inserting a reactor into an existing aqueous waste composition, said reactor comprising:
    one or more side wall perforated bio-remediation tubes, at least one of said tubes, independently, having therein one or more different types of tube packing substrates, said substrates being porous and having micro-pores therein;
    said reactor having a non-tube reactor area comprising one or more different types of non-tube packing substrate therein, said non-tube packing substrates being porous and having micro-pores therein;
    said reactor having multiple types of different microorganisms therein, said different multiple microorganisms, independently, being attached to said tube packing substrates and to said non-tube packing substrates;
    said bio-remediation reactor having at least one perforated chimney pipe said at least one chimney pipe being substantially free of packing substrates
    feeding air to said bio-remediation reactor and bio-remediating said aqueous waste composition; and
    emitting treated aqueous waste composition from said reactor.

19. The process of claim 18, wherein less than about 5% by volume of said at least one chimney pipe contains packing substrates therein.

20. The process of claim 19, said reactor being free of vertically spaced perforated separators in said non-tube reactor area; including admitting air to the bottom of said reactor, wherein said chimney pipe has bottom wall perforations, wherein said chimney pipe contains no packing substrates therein; wherein all of said perforated bioremediation tubes contain multiple microorganisms therein; wherein all of said perforated bioremediation tubes have bottom wall perforations therein; and wherein said perforated bioremediation tubes and said non-tube areas independently have only one type of packing substrate therein.

21. The process of claim 18, including at least one perforated sock containing said tube packing substrates therein, said sock located in a plurality of said perforated bioremediation tubes, and wherein said sock perforations are of a size to retain said tube packing substrate therein.

22. The process of claim 20, including at least one perforated sock containing said packing substrates therein, said sock located in a plurality of said perforated bio-remediation tubes, and wherein said sock perforations are of a size to retain said tube packing substrate therein.

* * * * *